United States Patent
Iguchi et al.

(10) Patent No.: US 7,006,668 B2
(45) Date of Patent: Feb. 28, 2006

(54) IMAGE PROCESSING METHOD AND IMAGE PROCESSING APPARATUS

(75) Inventors: Ryosuke Iguchi, Kawasaki (JP); Yuji Akiyama, Yokohama (JP); Manabu Yamazoe, Tokyo (JP); Okinori Tsuchiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 09/745,481

(22) Filed: Dec. 26, 2000

(65) Prior Publication Data

US 2001/0007599 A1 Jul. 12, 2001

(30) Foreign Application Priority Data

Dec. 28, 1999 (JP) .......................... 11-375538
Dec. 28, 1999 (JP) .......................... 11-375539
Aug. 31, 2000 (JP) ...................... 2000-263149

(51) Int. Cl.
*G06K 9/00* (2006.01)

(52) U.S. Cl. ...................... 382/108; 382/169; 382/274; 358/522; 358/530

(58) Field of Classification Search ................ 382/167, 382/168, 169, 274, 509, 520, 475, 521, 522, 382/1.9, 2.1; 358/522, 523, 530, 509, 520, 358/475, 521, 1.9, 2.1
See application file for complete search history.

(56) References Cited

U.S. PATENT DOCUMENTS

| | | | | |
|---|---|---|---|---|
| 4,410,909 A | | 10/1983 | Ueda et al. ................... | 358/75 |
| 4,679,095 A | | 7/1987 | Kitamura et al. ........... | 358/280 |
| 4,727,434 A | | 2/1988 | Kawamura .................. | 358/280 |
| 5,146,268 A | * | 9/1992 | Kagosaki et al. ............. | 355/70 |
| 5,831,748 A | | 11/1998 | Tsukada et al. ............. | 358/455 |
| 5,926,562 A | * | 7/1999 | Hyodo et al. ................ | 382/167 |
| 6,351,558 B1 | * | 2/2002 | Kuwata ....................... | 382/168 |
| 6,754,367 B1 | * | 6/2004 | Ito et al. ..................... | 382/103 |
| 6,762,741 B1 | * | 7/2004 | Weindorf .................... | 345/102 |

FOREIGN PATENT DOCUMENTS

| | | |
|---|---|---|
| EP | 0 557 099 A1 | 8/1993 |
| EP | 0 843 465 A2 | 5/1998 |
| EP | 0967791 A2 | 12/1999 |
| JP | 59-133770 | 8/1984 |
| JP | 2000-13626 | 1/1990 |
| JP | 6-22141 | 1/1994 |
| JP | 6-350851 | 12/1994 |
| JP | 10-283470 | 10/1998 |
| JP | 2002185793 | * 6/2002 |

* cited by examiner

*Primary Examiner*—Jerome Grant, II
(74) *Attorney, Agent, or Firm*—Fitzpatrick, Cella, Harper & Scinto

(57) ABSTRACT

On the basis of a discrimination parameter for discriminating more detailed brightness in an image, the brightness of the image is discriminated, and the optimum degree of correction component is set for the image, thereby performing a more faithful reproduction of the image indicated by image data. Therefore, a highlight point being a brightness value associated with a cumulative frequency of reaching a predetermined value is calculated in a high-brightness area on the basis of a histogram obtained with respect to the number of pixels of a brightness value indicated by the image data, and the image is discriminated in its entire brightness on the basis of the highlight point. On the other hand, a ratio of the cumulative frequency in a predetermined low-brightness area to the number of all the pixels in the histogram is calculated. On the basis of the calculated ratio and the discriminated brightness, a gamma value indicating degree of correction the brightness value to a value of more light image is defined. Accordingly, a suitable correction corresponding to brightness of an image can be performed.

44 Claims, 15 Drawing Sheets

| HLP | BALANCE DEGREE OF HISTOGRAM (S128) | SDP | CORRECTION GRADATION CURVE |
|---|---|---|---|
| −200 | 0−60 | 0−10 | HIGH-BRIGHTNESS AREA OF 200 OR MORE IS CUT |
| | | 11−30 | HIGH-BRIGHTNESS AREA OF 200 OR MORE IS CUT, AND γ 0.8 IS MULTIPLIED |
| | | 31− | HIGH-BRIGHTNESS AREA OF 200 OR MORE, AND LOW-BRIGHTNESS AREA OF 30 OR LESS ARE CUT |
| | 61−100 | 0−5 | HIGH-BRIGHTNESS AREA OF 200 OR MORE IS CUT, AND γ 1.2 IS MULTIPLIED |
| | | 6− | HIGH-BRIGHTNESS AREA OF 200 OR MORE IS CUT |
| 201−230 | 0−30 | 0−10 | γ 0.8 CURVE |
| | | 11− | HIGH-BRIGHTNESS AREA OF 230 OR MORE IS CUT, AND γ 0.8 IS MULTIPLIED |
| | 31−60 | 0−5 | NO CORRECTION IS PERFORMED |
| | | 6−20 | S-CURVE |
| | | 21− | LOW-BRIGHTNESS AREA OF 20 OR LESS IS CUT |
| | 61−100 | 0−15 | HIGH-BRIGHTNESS AREA OF 230 OR MORE IS CUT |
| | | 16− | HIGH-BRIGHTNESS AREA OF 230 OR MORE IS CUT, AND γ 0.8 IS MULTIPLIED |
| 231−255 | 0−15 | 0−30 | γ 0.9 CURVE |
| | | 31−50 | γ 0.8 CURVE |
| | | 51− | LOW-BRIGHTNESS AREA OF 50 OR LESS IS CUT |
| | 16−50 | 0−8 | NO CORRECTION IS PERFORMED |
| | | 9−20 | S-CURVE |
| | | 21− | LOW-BRIGHTNESS AREA OF 20 OR LESS IS CUT |
| | 51−100 | 0−10 | γ 1.2 CURVE |
| | | 11− | γ 1.1 CURVE |

| KIND OF PIXEL | Slow | OPTIMUM γ VALUE |
|---|---|---|
| LIGHT | 0—30 | 0.8 |
| | 31—60 | 1 |
| | 61— | 1.2 |
| DARK | 0—15 | 0.8 |
| | 16—30 | 1 |
| | 31— | 1.2 |

FIG. 17

| HLP | BALANCE DEGREE OF HISTOGRAM (S128) | SDP | CORRECTION GRADATION CURVE |
|---|---|---|---|
| –200 | 0–60 | 0–10 | HIGH-BRIGHTNESS AREA OF 200 OR MORE IS CUT |
| | | 11–30 | HIGH-BRIGHTNESS AREA OF 200 OR MORE IS CUT, AND $\gamma$ 0.8 IS MULTIPLIED |
| | | 31– | HIGH-BRIGHTNESS AREA OF 200 OR MORE, AND LOW-BRIGHTNESS AREA OF 30 OR LESS ARE CUT |
| | 61–100 | 0–5 | HIGH-BRIGHTNESS AREA OF 200 OR MORE IS CUT, AND $\gamma$ 1.2 IS MULTIPLIED |
| | | 6– | HIGH-BRIGHTNESS AREA OF 200 OR MORE IS CUT |
| 201–230 | 0–30 | 0–10 | $\gamma$ 0.8 CURVE |
| | | 11– | HIGH-BRIGHTNESS AREA OF 230 OR MORE IS CUT, AND $\gamma$ 0.8 IS MULTIPLIED |
| | 31–60 | 0–5 | NO CORRECTION IS PERFORMED |
| | | 6–20 | S-CURVE |
| | | 21– | LOW-BRIGHTNESS AREA OF 20 OR LESS IS CUT |
| | 61–100 | 0–15 | HIGH-BRIGHTNESS AREA OF 230 OR MORE IS CUT |
| | | 16– | HIGH-BRIGHTNESS AREA OF 230 OR MORE IS CUT, AND $\gamma$ 0.8 IS MULTIPLIED |
| 231–255 | 0–15 | 0–30 | $\gamma$ 0.9 CURVE |
| | | 31–50 | $\gamma$ 0.8 CURVE |
| | | 51– | LOW-BRIGHTNESS AREA OF 50 OR LESS IS CUT |
| | 16–50 | 0–8 | NO CORRECTION IS PERFORMED |
| | | 9–20 | S-CURVE |
| | | 21– | LOW-BRIGHTNESS AREA OF 20 OR LESS IS CUT |
| | 51–100 | 0–10 | $\gamma$ 1.2 CURVE |
| | | 11– | $\gamma$ 1.1 CURVE |

IMAGE PROCESSING METHOD AND IMAGE PROCESSING APPARATUS

BACKGROUND OF THE INVENTION

1. Field of the Invention

The present invention relates to an image processing method and an image processing apparatus, and more particularly to an image processing method and an image processing apparatus for performing a correction process to image data such as a digital photographic image or the like.

2. Related Background Art

In recent years, with the advance of inkjet printing technology, a printout image more excellent than conventional one can be obtained by using a high-pixel digital camera and printing technology such as an inkjet printing system.

However, in case of printing out a digitalized photographic image, there are problems to be improved in quality of the image to be output. With respect to the problems, as one of the cause, it is considered that color balance for an entire image is disordered due to, e.g., an overexposure state or an underexposure state of the image, or a phenomenon so-called "color fog".

For example, in case of performing automatic photographing using a camera, since AE (automatic exposure) is functioned, if the blue sky is contained in the most part of a background, an underexposure photographing state of inviting a dark scene is provided, thereby resulting in a state that a subject is taken in an unexcellent state.

As an example of a digital camera, since an image is taken by a CCD (charge coupled device) camera, a color of a wavelength not visible to human eyes is also captured as an image. Then, when a signal containing that color information is processed as signals R (red), G (green) and B (blue) (or R, G and B signals), the color not be naturally recognized by the human eyes becomes visible color, thereby sometimes resulting in an unsuitable color balance. In this case, although a process of cutting infrared rays by using a filter is performed, this process is not always perfect measures. Furthermore, a color correction balance is limited by a method of a real-time correction. As a result, a perfect process is hard to be performed, and an entire color balance is not often perfectly ensured.

Such disorder in color balance on a taken image gives an influence to a print image as a result. Therefore, in order to obtain an excellent printed out result, it is desirable to correct an input image itself, such as a taken image or the like, to an image of having suitable color balance.

As a method of performing this correction, the present inventor proposed a method of setting a correction condition on the basis of the highest brightness or the lowest brightness obtained by analyzing a histogram of an image, in Japanese Patent Application No. 10-177272 (corresponding to U.S. patent application Ser. No. 09/337,548 filed on Jun. 22, 1999).

Incidentally, the following problem other than the "color fog" or the color balance disorder depends on the exposure is found in quality of an image to be printed.

As described above, with the advance of the inkjet printing technology in recent years, dots formed by ink are minimized to level of exceeding a visible limit, and printing of "nongranular state" can be realized. In this point, the inkjet printing technology is almost equal to printing technology of a silver bromide photograph. However, according to a characteristic of ink used in the inkjet printing, there has been remained a problem that an absolute density realized in a print image is lower than that of the silver bromide photograph as shown in FIG. 20.

It should be noted that this problem is not peculiar to the inkjet printing technology, but the similar problem is found in another printing system or a display such as a CRT (cathode ray tube) or the like. Generally, it has been known that an output image becomes clear by properly increasing the density, and an excellent color image properly reproduced can be obtained.

If the density is uniformly increased for the purpose of increasing density of an output image, gradation of a dark part is crushed or broken in an image having lots of dark parts. As a result, image quality is sometimes deteriorated.

SUMMARY OF THE INVENTION

An object of the present invention is to provide an image processing method and an image processing apparatus which can improve quality of an output image by properly setting a correction condition in accordance with a characteristic of an image.

In order to achieve the abovementioned object, the present invention provides an image processing method which sets a correction condition for correcting components regarding brightness of image data on the basis of a histogram corresponding to the components regarding image brightness represented by the image data, and corrects the image data according to the set correction condition, said method comprising the steps of:

calculating a ratio of the components included within a predetermined range in the histogram; and setting the correction condition on the basis of the calculated ratio.

Further, the present invention provides an image processing method which discriminates degree of lightness of an image on the basis of a histogram related to the number of pixels of a component value regarding image brightness indicated by image data, sets degree of correcting components regarding brightness of the image data on the basis of the discriminated result, and corrects the components according to the set correction degree, said method comprising the steps of:

calculating a component value in the histogram wherein a cumulative frequency accumulated from the maximum value or the minimum value indicates a predetermined value within a range of the component value;

calculating a cumulative frequency accumulated from the maximum value or the minimum value to a predetermined component value in the histogram;

discriminating the degree of lightness on the basis of the calculated component value and the cumulative frequency; and setting the correction degree on the basis of the discriminated result.

Another object of the present invention is to suppress the crush in the dark part gradation.

In order to achieve the abovementioned object, an image processing method which sets a correction condition for an input image in accordance with a ratio of a shadow area in the input image, said method comprising the steps of:

setting first correction condition for the input image in accordance with a ratio of a first shadow area in the input image; and adjusting a correction condition for a shadow area of the first correction condition in accordance with a ratio of a second shadow area, of which extent is different from that of the first shadow area, in the input image.

Other objects and features of the present invention will become apparent from the following detailed description and the attached drawings.

BRIEF DESCRIPTION OF THE DRAWINGS

FIG. 17 is a view showing table content used in the gradation curve judgement process and explaining a method of determining the gradation curve corresponding to the kind of image;

DETAILED DESCRIPTION OF THE PREFERRED EMBODIMENTS

[First Embodiment]

Figure 1:
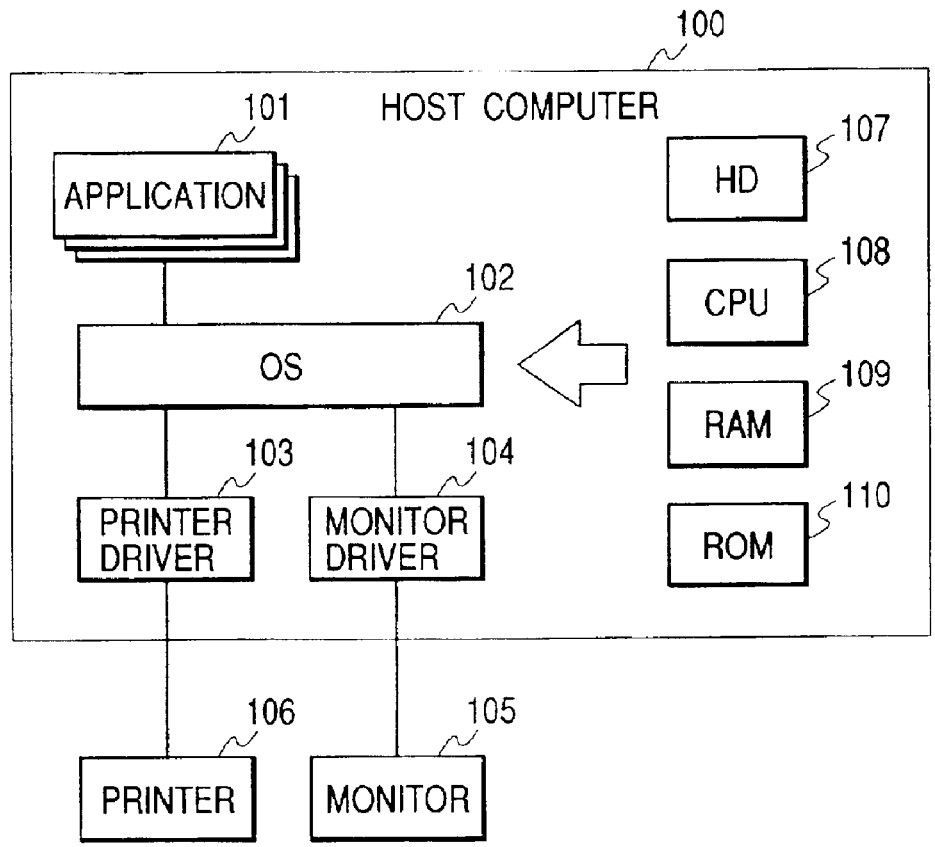
FIG. 1 is a block diagram showing the structure of a print system according to an embodiment of the present invention.

FIG. 1 is a block diagram schematically showing the structure of a print system according to an embodiment of the present invention. This system is mainly structured by a host computer 100, a printer 106 and a monitor 105. For example, the inkjet system printer 106 and the monitor 105 are connected to the host computer 100 to realize an interactive communication.

The host computer 100 has an OS (operating system) 102, application software (hereinafter simply called an application) 101 such as word processor, spreadsheet calculation, an image process, the Internet browser and the like, of which each process is performed under a control of the OS 102, a printer driver 103 for producing print data by processing various drawing command groups (image drawing command, text drawing command and graphics drawing command) used for displaying an output image issued by the application, and a monitor driver 104 for displaying images on the monitor 105 by processing the various drawing command groups similarly issued by the application 101 as the same application as that of the printer driver.

The host computer 100 has a central processing unit (CPU) 108, a hard disk driver (HD) 107, a random access memory (RAM) 109, a read only memory (ROM) 110 and the like as various hardware capable of being operated by the above application. That is, the CPU 108 performs a signal process concerning the process according to the above application, and the various applications are previously stored into a hard disk driven by the HD 107 and the ROM 110 to be read out if needed. The RAM 109 is used as a working area or the like for the signal process to be performed by the CPU 108.

As the embodiment shown in FIG. 1, the following structure can be given. That is, e.g., as an OS, Microsoft Windows 98™ is used for a widely used AT-compatible personal computer of IBM, to which a monitor and a printer are connected and an application capable of performing an optional print process is installed.

In such the print system as above, on the basis of an image displayed on the monitor 105 by the application 101, a user can produce image data constituted by text data classified into text such as characters, graphics data classified into graphics such as figures, picture data classified into natural images and the like similarly through a process according to the application.

When the user instructs a print output of the produced image data, the application 101 requests the OS 102 to perform the print output and issues the drawing command groups indicating an output image structured by a graphics data portion as a graphics drawing command and a picture data portion as an image drawing command to the OS 102. Upon receiving a print output command from the application, the OS 102 issues the drawing command groups to the printer driver 103 corresponding to a printer which performs that print output.

The printer driver 103 processes the print output command and the drawing command groups input from the OS 102 and produces print data having a format capable of being printed by the printer 106 to transfer it to the printer 106. In this case, if the printer 106 is a raster printer, the printer driver 103 sequentially performs an image correction process for the drawing command from the OS 102 and sequentially rasterizes the drawing command to an RGB 24-bit page memory, then the content of the RGB 24-bit page memory is converted into a data format printable for the printer 106 such as C, M, Y and K data after rasterizing all the drawing commands, and the converted data is transferred to the printer 106.

Figure 2:
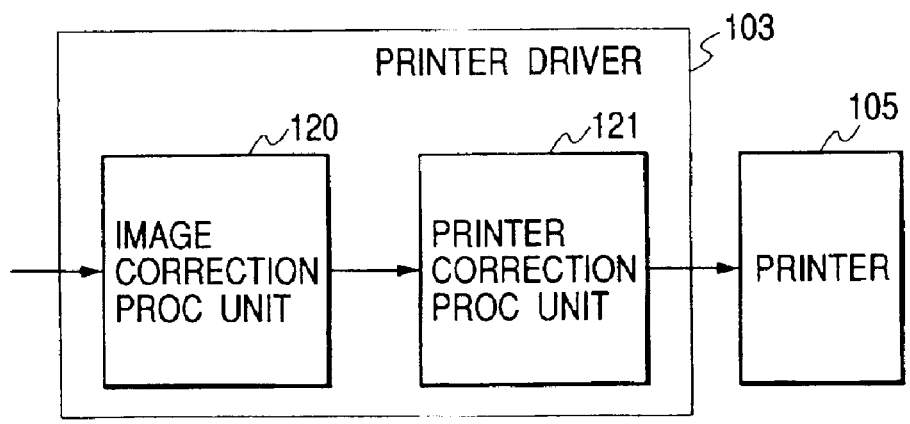
FIG. 2 is a view showing a process performed in a printer driver in the print system.

FIG. 2 shows a process to be performed by the printer driver 103. This process is mainly composed of an image correction process and a printer correction process.

An image correction processing unit 120 performs the image correction process for color information generated by brightness signals R, G and B included in the drawing command groups input from the OS 102. More particularly, automatic gradation correction process to be described later is performed on the basis of red (R), green (G) and blue (B) color information. On the other hand, a printer correction processing unit 121 initially rasterizes the drawing command of the color information corrected by the image correction processing unit 120, and produces a raster image to the RGB 24-bit page memory. Then, cyan (C), magenta (M), yellow (Y) and black (K) data which depend on color reproducibility of a printer performing printing for each predetermined pixel is produced, and the produced data is transferred to the printer 106.

Next, the automatic gradation correction process being the process performed by the image correction processing unit 120 will be explained. The automatic gradation correction process is performed to a picture. Therefore, when a graphics image and the picture are included in image data, the picture part is extracted from the image data and the automatic gradation correction process is performed to the extracted picture part.

Figure 3:
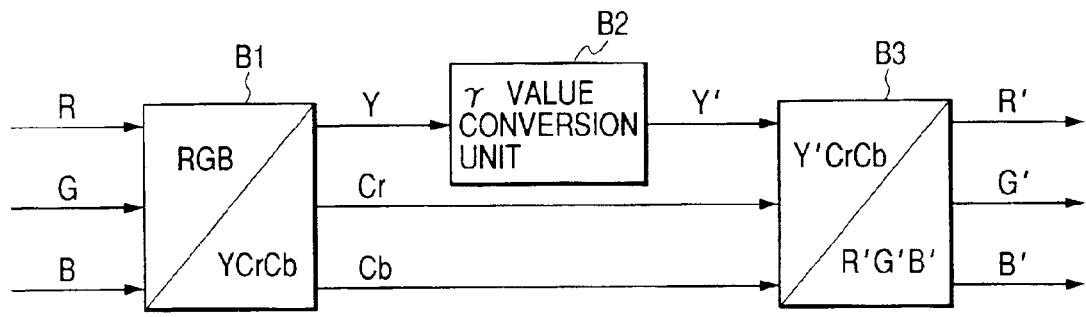
FIG. 3 is a view mainly showing the structure in converting signals in an automatic gradation correction process performed as an image correction process in the process performed in the print driver.
Figure 4:
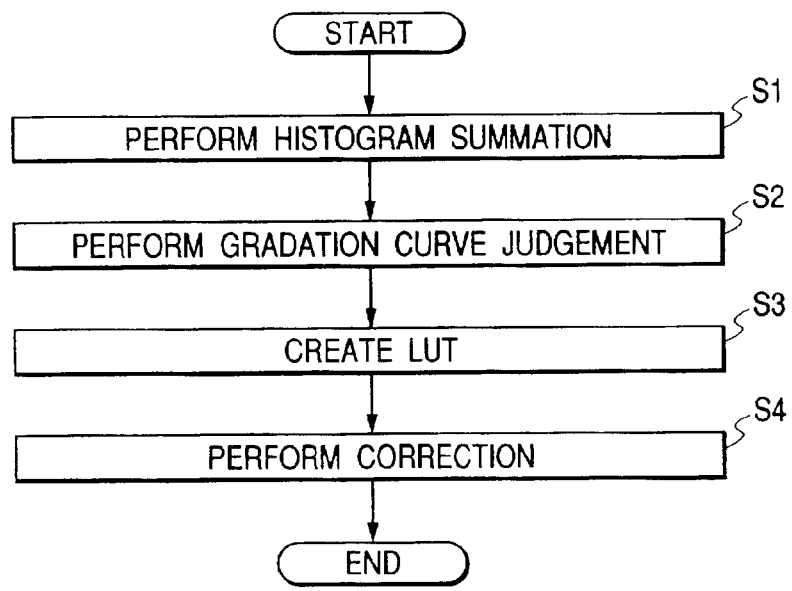
FIG. 4 is a flow chart showing a procedure of the automatic gradation correction process.

FIG. 3 is a conceptional vies mainly showing a conversion of each signal performed in the automatic gradation correction process. FIG. 4 is a flow chart showing a process procedure thereof. The automatic gradation correction process in the present embodiment is performed by judging brightness of an image to be printed using a histogram of summing frequency of each brightness value in the image data and determining degree of a suitable correction (gamma value). Hereinafter, this process will be explained with reference to a flow chart shown in FIG. 4.

(Histogram Summation)

As shown in FIG. 4, first, in a histogram summation process in a step S1, the input image signals R, G and B are converted into a brightness Y being a component of image brightness and color difference signals Cr and Cb being components of hue (B1 in FIG. 3). A conversion expression thereof is as follows.

$$Y = 0.299 \times R + 0.587 \times G + 0.114 \times B$$

$$Cr = R - Y$$

$$Cb = B - Y$$

Next, as to the signal Y corresponding to the brightness among the converted signals Y, Cr and Cb, a brightness value (value of signal Y) for each pixel in the image data is investigated, and a histogram of brightness (frequency distribution) is created by summing the frequency of pixel having the corresponded brightness for each brightness value represented by values of 0 to 255.

Figure 5:
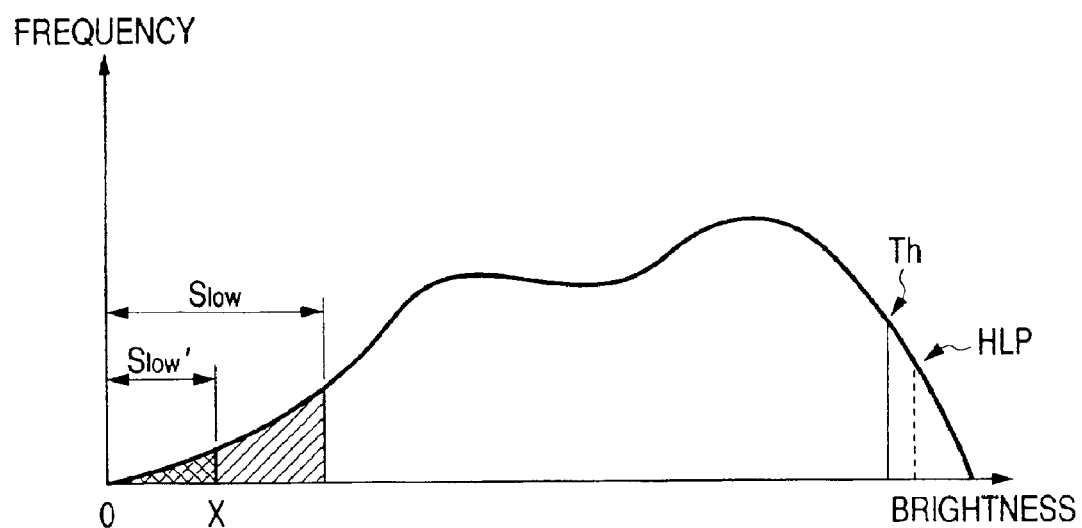
FIG. 5 is a view showing a histogram in a case where an image to be processed by the automatic gradation correction process is a light image.
Figure 6:
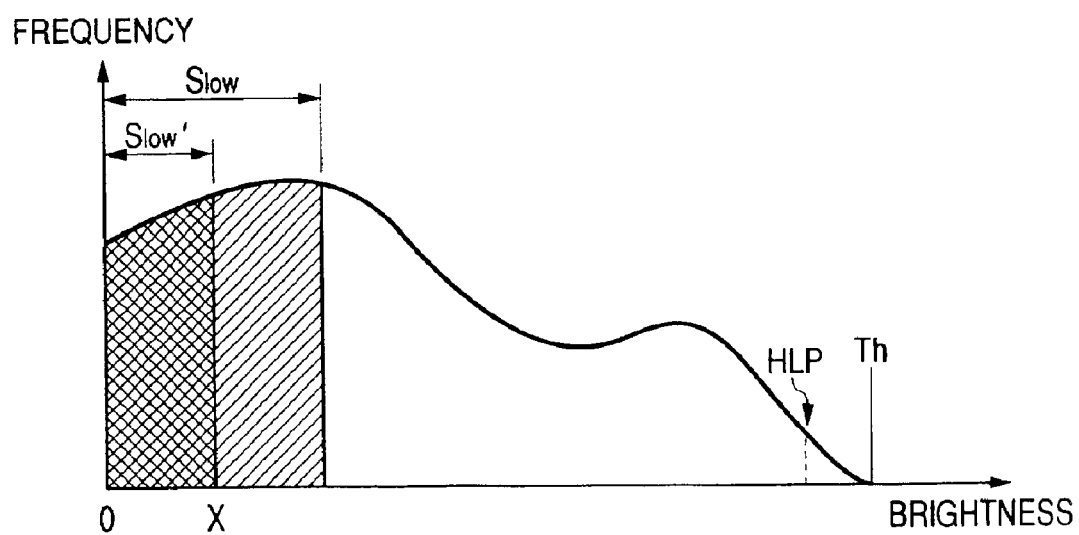
FIG. 6 is a view showing a histogram in a case where the image to be processed by the automatic gradation correction process is a dark image.

In this histogram, e.g., when the image data indicates an entirely light image, distribution is biased to the high-brightness side as shown in FIG. 5. On the other hand, when the image data indicates an entirely dark image, distribution is biased to the low-brightness side as shown in FIG. 6.

It should be noted that since creation of the histogram of brightness is performed for the purpose of investigating the frequency distribution of the brightness in an entire image, the summation of frequency is not always performed to all pixels. For example, for image data of 1600×1200 pixels, the summation may be performed for the pixels thinned out fifteen pixels by fifteen pixels in the lateral direction and eleven pixels by eleven pixels in the longitudinal direction or may be performed by using an average value calculated from each of these pixels and respectively corresponded surrounding pixels.

(Gradation Curve Judgement)

In a step S2, a gradation curve judgement process is performed on the basis of the histogram as above obtained. That is, it is judged that what kind of a gradation curve, which is a correction curve corresponding to the gamma value in a brightness correction, is to be defined. In the gradation curve judgement process according to the present embodiment, image brightness to be processed by two parameters described later, that is, a highlight point and a gamma parameter (the number of pixels in low-brightness area) is to be judged, and the gamma value, that is, the gradation curve corresponding to the gamma value is defined on the basis of the judged result.

Figure 7:
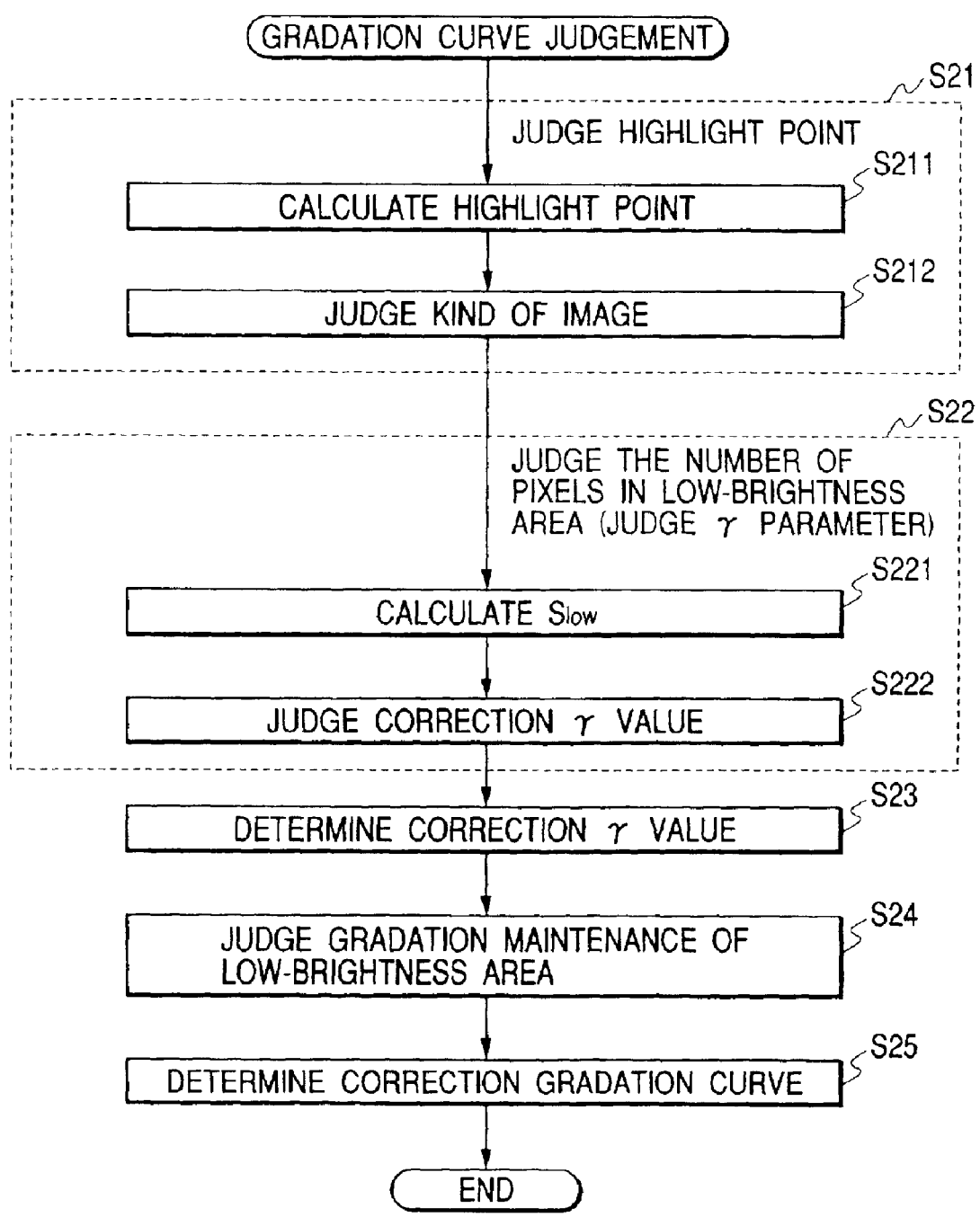
FIG. 7 is a flow chart showing a process procedure of a gradation curve judgement in the automatic gradation correction process shown in FIG. 4.

FIG. 7 is a flow chart showing the gamma judgement process in detail, and the gamma judgement process in the present embodiment will be explained with reference to this flow chart.

(Highlight Point Judgement)

In a highlight point judgement process of a step S21, a highlight point in an image to be processed is calculated on the basis of the histogram (step S211).

In the present embodiment, the frequency of each brightness value is accumulated successively sliding from the highest brightness value (brightness value 255) within a brightness range to the low-brightness side in the histogram of the brightness signal Y. As to the obtained cumulative frequency, e.g., the brightness value coincided with 1.0% of the number of all the pixels of the image data to be processed or the brightness value initially exceeding 1.0% of the number of all the pixels is obtained, and the point of this value is assumed to be a highlight point (hereinafter called "HLP").

Next, the magnitude of the HLP obtained in this way and the brightness value are compared each other using a previously determined threshold Th. When HLP>Th, it is judged that the image is a light image, and when HLP≦Th, it is judged that the image is a dark image (step S212). That is, according to this process, two kinds of images are discriminated in their lightness and darkness. As the threshold Th to be used in the present embodiment, a comparatively high-brightness value such as a value 220 or the like is used.

For example, in a histogram of a comparatively light image shown in FIG. 5, the HLP exceeds the threshold Th (HLP>Th). Accordingly, it is judged that the image is light. In this case, since the distribution of the histogram is overall biased to the high-brightness side as above, the HLP is positioned on the high-brightness side as a result.

On the other hand, in a histogram of a comparatively dark image shown in FIG. 6, the HLP is equal to or less than the threshold Th (HLP≦Th). Accordingly, it is judged that the image is dark. In this case, since the brightness distribution is overall biased to the low-brightness side and the HLP is positioned on the low-brightness side, the judgement is obtained.

As above, the highlight point is obtained on the basis of the histogram of the image to be processed. Based on this method, by entirely judging the light and darkness of the image, the extent of correction, that is, the gamma value can be varied associated with the distribution in a low-brightness area of the image to be processed according to the discriminated light and darkness, as described later in FIG. 8. For example, when it is judged that the image is dark, probability of correcting the image by the small gamma value (increase density, to be darker) can be decreased as compared with a case that it is judged that the image is light even in the distribution of the same low-brightness area (ratio of the low-brightness area). Accordingly, an entirely dark image, that is, an image having a little distribution in the low-brightness area can be printed with an entirely low density and so-called crush (or break) in a high density part in a print image can be prevented. On the contrary, when it is judged that the image is light, the probability of correcting the image by the small gamma value (increase density, to be darker) can be increased. Accordingly, it becomes possible to compensate a comparatively low density output characteristic primarily held by a printing device such as a printer or the like.

It should be noted that a calculation of the HLP is not always required by the abovementioned method but may be applicable to properly use a conventional known system.

In case of performing the automatic gradation correction process of the present embodiment, by using another image correction process, e.g., combining with the above color fog correction, a contrast correction and a saturation correction, the HLP previously used in this image process can also be used. Furthermore, lightness (darkness) of an image can be discriminated using a shadow point similarly used in the above color fog correction or the like. According to this fact, it is apparent from the following explanation that the following process can be performed.

(Judgement of the Number of Pixels (Judgement of Gamma Parameter) in Low-Brightness Area (Shadow Area))

Next, in a step S22, a judgement of low-brightness area distribution is similarly performed using the histogram obtained in the step S1 for the images roughly classified into two categories of the light image and the dark image by the highlight point judgement.

In the judgement process of the number of pixels in the low-brightness area, initially, an $S_{low}$ being a ratio of the cumulative frequency in a predetermined low-brightness area to the number of all the pixels of an image to be processed is obtained in a step S221. Correction degree, that is, a suitable gamma value is calculated by detailedly obtaining the low-brightness area distribution, and an entire increase of the density can be realized without generating the crush particularly in the low-density area in the print image.

First, as a preprocess, a cumulative frequency S in the low-brightness area is calculated. The cumulative frequency S in the low-brightness area is obtained as the cumulative frequency accumulated up to a predetermined brightness value sliding from the lowest brightness value (brightness value 0) to the high-brightness side within a brightness range, in the histogram. In the present embodiment, a cumulative frequency accumulated up to a brightness value (brightness value 64) being a quarter of the maximum brightness value (brightness value 255) is obtained as the cumulative frequency S in the low-brightness area.

Next, the ratio $S_{low}$ being a ratio of the obtained cumulative frequency S in the low-brightness area to the number of all the pixels is calculated.

That is, the ratio $S_{low}$ is expressed as follows.

$S_{low}$=(cumulative frequency S in the low-brightness area)/(the number of all the pixels) (%)

In case of performing the histogram summation, if a thinned-out histogram is created by thinning out the pixels, a denominator in the above definite expression of the ratio $S_{low}$ is the number of pixels to be performed histogram creation.

Next, in a step S222, a judgement of the gamma value (gamma parameter) is performed using the above-obtained ratio $S_{low}$.

Figures 8, 9:
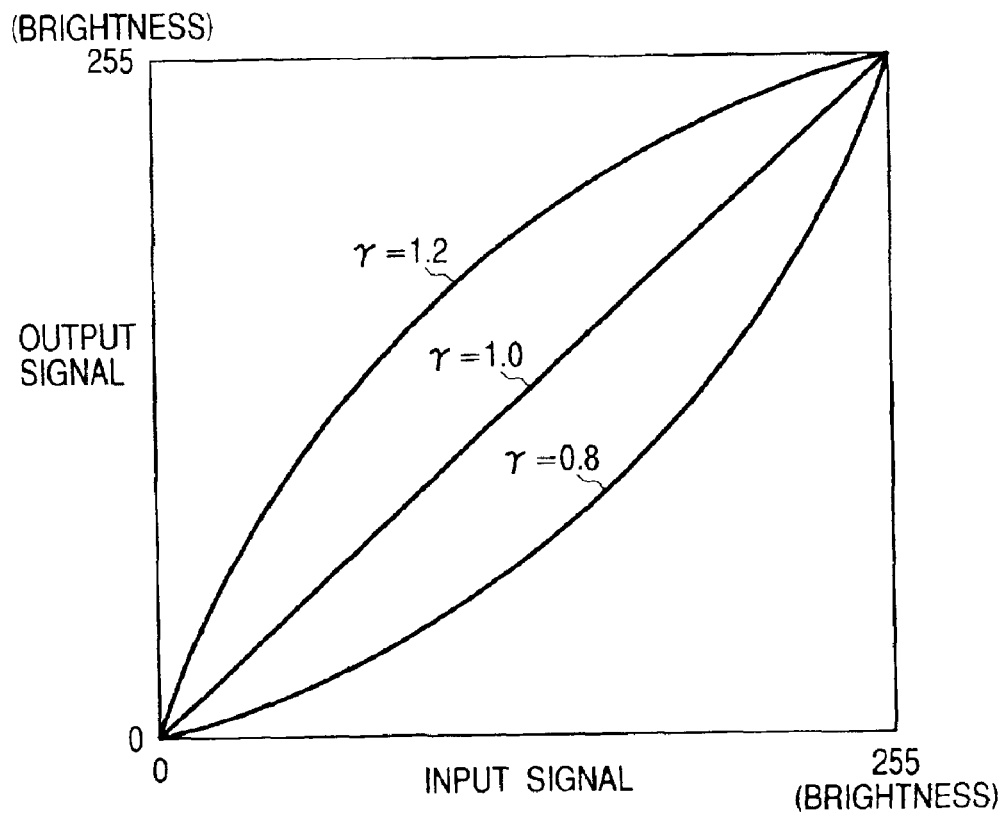
FIG. 8 is a view showing table content used in the gradation curve judgement and explaining a method of determining a gamma (γ) value corresponding to the kind of image.
FIG. 9 is a view showing a conversion characteristic curve of a brightness correction table corresponding to the gamma value.

More particularly, this judgement is the process of determining a range containing the ratio $S_{low}$ in a table shown in FIG. 8. That is, the range of the ratio $S_{low}$ is varied according to the light and darkness of the image corresponding to the HLP judgement. As to the image judged to be a light image, the ratio $S_{low}$ is classified into three kinds of ranges of the ratio $S_{low}$=0 to 30, the ratio $S_{low}$=31 to 60 and the ratio $S_{low}$ exceeding 61. On the other hand, as to the image judged to be a dark image in the HLP judgement, the ratio $S_{low}$ is classified into three kinds of ranges of the ratio $S_{low}$=0 to 15, the ratio $S_{low}$=16 to 30 and the ratio $S_{low}$ exceeding 31.

For example, in case of the comparatively light image shown in FIG. 5, the ratio of the area indicated by oblique lines to the number of all the pixels is to be $S_{low}$. In this example, the ratio $S_{low}$ reaches 10%. Therefore, the image is judged to be the light image by the HLP judgement and it is judged that the ratio $S_{low}$ is in the range 0 to 30. On the other hand, in case of the comparatively dark image shown in FIG. 6, a ratio of the area of the ratio $S_{low}$ indicated by oblique lines to the number of all the pixels reaches 40%. Therefore, the image is judged to be the dark image by the HLP judgement and it is judged that the ratio $S_{low}$ is in a range exceeding 31.

Here, in case of using a method of judging the distribution of the low-brightness part only using the shadow point (e.g., brightness value being a value of coinciding with 1.0% for the number of all the pixels or initially exceeding 1.0% in case of accumulating each frequency successively sliding from the minimum brightness value to the high-brightness side in the histogram) without using the ratio of the above cumulative frequency, a judgement of image brightness wherein an actual distribution state of the low-brightness area is not properly reflected is to be performed. For example, in case of an image having a little frequency distribution of the low-brightness area because of actually existing a peak of the frequency distribution on near the shadow point, even if the shadow point itself is indicating a comparatively high-brightness value, an erroneous judgement that the image is comparatively light is given and a small gamma value (brightness correction of increasing density) is selected. As a result, a dark part occupying a comparatively large part on the image is sometimes crushed.

For this problem, by obtaining the cumulative frequency in the low-brightness area and using the ratio $S_{low}$ of the cumulative frequency to the number of all the pixels as the abovementioned embodiment, it becomes possible to perform a judgement of the light and darkness of an image on which more actual low-brightness distribution is reflected. Accordingly, a suitable gradation correction can be performed for the above comparatively dark image.

In the present embodiment, as to the range of the ratio $S_{low}$, although the range of the brightness values 0 to 60 is uniformly divided, if more detailed information of the low-brightness area is to be obtained, the low-brightness area may be divided into some parts and the situation division may be performed to each of the divided parts. Also, the ratio $S_{low}$ may be weighted twice in the range of the brightness values 0 to 30 and once in the range of the brightness values 31 to 60, and then weighted values may be added.

(Determination of Correction Gamma Value)

According to the above judgement process of the number of pixels in the low-brightness area, the image to be processed is classified into six kinds of images, that is, three kinds of light images and three kinds of dark images as shown in FIG. 8 by determining the range including the ratio $S_{low}$ in the low-brightness area. The, in a next step S23, the gamma value is determined using the table shown in FIG. 8.

As apparent from a gradation curve (correction table) shown in FIG. 9, the gamma value 0.8, 1.0 or 1.2 is set. As described above, the gamma value represents the degree of correcting an image to more light image (lower density in the print image) and does not represent a correction ratio for each input brightness value. The correction ratio for each the input value is represented by the curve indicating each table content shown in FIG. 9.

The determination of the gamma value regarding the image classified into the six kinds of images is performed using the table shown in FIG. 8 as follows. For example, in a case where the image is judged to be the light image by the HLP judgement, the gamma value is set as γ=0.8 when the ratio $S_{low}$=0 to 30, γ=1.0 (i.e., not corrected) when the ratio $S_{low}$=31 to 60, and γ=1.2 when the ratio $S_{low}$ exceeds 61. More particularly, correction look-up tables (LUT) corresponding to each of the gamma values are prepared as described later.

In case of the comparatively light image shown in FIG. 5, since the HLP is larger than the threshold Th and the ratio $S_{low}$ is equal to 10%, the image is judged to be the light image using the table content shown in FIG. 8 and the gamma value is set as 0.8. According to the gamma value determination, a correction of also reducing brightness (increase printing density) of a comparatively high-brightness area is performed and the print image becomes to have entirely optimum density. Also, since the ratio of the ratio $S_{low}$ in the pixels of the low-brightness area is in a low level, crushed parts in an image can be resulted in a few parts.

On the other hand, in case of the comparatively dark image shown in FIG. 6, since the HLP is less than the threshold Th and the ratio $S_{low}$ is equal to 40%, the gamma value is set as 1.2 using the table content shown in FIG. 8. According to the gamma value determination, an entire of the image to be printed becomes light. Especially, the low-brightness area occupies 40% of the image becomes light, thereby obtaining a print image having an excellent density balance.

In the above description, although the judgement of image brightness is performed by the case division of two stages in the HLP judgement (S21), more detailed judgement may be performed by dividing the case into three stages of a light image, an intermediate brightness image and a dark image or into more than three stages in order to obtain more suitable gamma value. In this case, in the judgement of the number of pixels in the low-brightness area (S22), in case of the intermediate brightness image, in addition to the threshold for the ratio $S_{low}$ indicated in FIG. 8, e.g., the gamma value may be set as γ=0.8 when the ratio $S_{low}$=0 to 20, γ=1.0 when the ratio $S_{low}$=21 to 40 and γ=1.2 when the ratio $S_{low}$ exceeds 41.

(Gradation Maintenance Judgement in Low-Brightness Area (Shadow Area))

Next, in a step S24 of FIG. 7, the gradation maintenance judgement in the low-brightness area is performed. In case of performing the correction based on the gamma value determined as above, it is judged whether there is the high-density part crushed by what extent of density on the print image obtained by the above correction. Then, in accordance with the judged result, it is judged whether or not the gradation in the high-density area is to be maintained, when the density of the print image is increased by performing the gamma correction process.

First, frequency up to a predetermined point (brightness value X) is accumulated sliding from the lowest brightness value (brightness value 0) to the high-brightness side in a brightness range in the histogram obtained as above. For example, this value X can be set as a point (brightness value 32) being ⅛ times of the maximum brightness value (brightness value 255). The brightness range up to this value X is such a range, in which the gradation curve can be corrected in a gradation curve determination process described later. In other words, this range is a range capable of obtaining an image entirely having an excellent gradation of preventing the color crush while maintaining the gradation in the high-density part on the print image by adjusting the gradation in this range. This range can be obtained experientially or experimentally.

The cumulative frequency obtained up to the value X in this way is assumed to be an S'. Next, the percentage of the cumulative frequency S' to the number of all the pixels is calculated. A ratio of the cumulative frequency to the number of all the pixels in the low-brightness area is assumed to be an $S_{low}$'. In this case, it is expressed as follows.

$S_{low}$'=(cumulative frequency S' in the low-brightness area)/(the number of all the pixels) (%).

For example, in case of the image indicated by the histogram shown in FIG. 5, an area indicated by dark oblique lines is an area having a ratio represented by the ratio $S_{low}$', and this ratio reaches 5%. As in this example, when the ratio $S_{low}$' is small, even if a correction of increasing the density of the print image is performed by setting the gradation curve of the small gamma value, it is apparent from FIG. 5 that an area of color crushed is minimized. On the other hand, in the example shown in FIG. 6, the ratio $S_{low}$' reaches 20%. In this example, the ratio $S_{low}$' is a comparatively large value. In this case, when the gradation curve of the small gamma value is set, color from the intermediate-brightness area to the high-brightness area becomes clear. However, the high-density area of the print image obtained by correcting the low-brightness area occupying 20% of this area is darkly crushed.

(Determination of Correction Gradation Curve)

On the basis of the ratio $S_{low}$' obtained by the gradation maintenance judgement process in the low-brightness area performed in the step S24 described above, a correction gradation curve determination process is performed in a step S25. That is, in this process, attention is payed on the ratio $S_{low}$', and the gradation curve capable of increasing the density of the image is set without generating the crush in the high-density area in the print image depended on a result obtained by correcting the low-brightness area. More particularly, for each gamma value obtained by the above determination process of the correction gamma value (S23), a range and inclination of a linear graph for maintaining gradation in the low-brightness area on the gradation curve are defined on the basis of the ratio $S_{low}$'.

Figure 10:
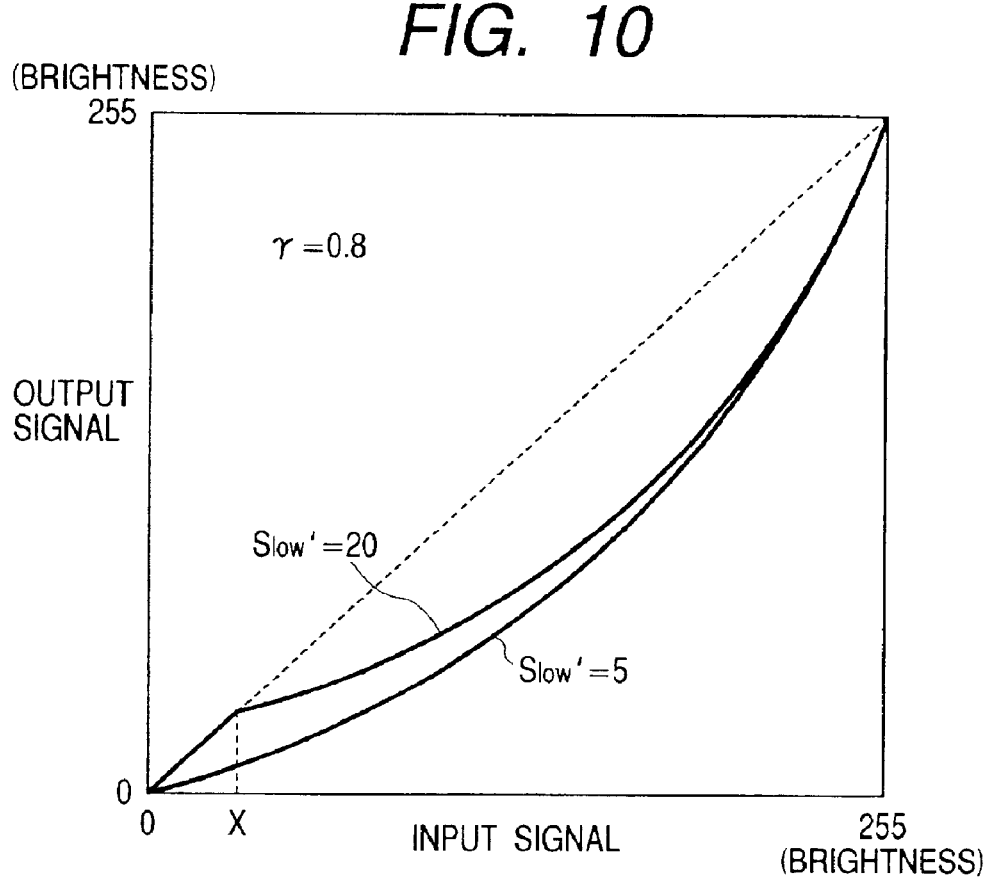
FIG. 10 is a view showing the conversion characteristic curve of the brightness correction table and explaining a change of a gradation curve for maintaining gradation in a low-brightness area.

In FIG. 10, for example, with respect to an image to be processed, if it is assumed that the gamma value is defined as γ=0.8 in the above determination process of the correction gamma value (S23), then the ratio $S_{low}'$ is defined as the ratio $S_{low}'$=0 to 5 in the above gradation maintenance judgement process in the low-brightness area (S24), since it is judged that the ratio of an area to be darkly crushed is in a low level even if the density of an entire print image is to be increased, the gradation curve, which is represented by the above expression simply using the obtained gamma value as it is, is to be adopted. On the other hand, when the gamma value is 0.8 and the ratio $S_{low}'$ exceeds 6%, if the density of an entire print image is to be increased, it is judged that the ratio of an area of the high-density part to be darkly crushed is in a high level, and gradation of pixels corresponding to the brightness value from 0 to X is maintained (i.e., correction is not performed by assuming that the gamma value is equal to one). In the range corresponding to the brightness value from (X+1) to the maximum brightness value (brightness value 255), the correction based on the gradation curve (curve represented by an expression of the ratio $S_{low}'$=20 in FIG. 9) represented by the same expression as that of the above expression is performed. More particularly, in an example shown in FIG. 10, the following expressions are given.

$$Y' = Y \text{ within a range } 0 \le Y \le 30, \text{ and}$$

$$Y' = 224 \times \{[(Y-31)/224]^{1/\gamma}\} + 31 \text{ within a range } 31 \le Y \le 255.$$

within a range $31 \le Y \le 255$.

The above explanation relates to a case that the gamma value is equal to 0.8. However, the threshold used in discriminating if the gradation curve is changed or not changed according to the above ratio $S_{low}'$ (as above example, when the gamma value is equal to 0.8, the ratio $S_{low}'$ becomes 6) can be varied every the gamma value. However, when the gamma value exceeds 1.0, since the correction does not become a correction of increasing the density of the print image, the gradation curve is not changed in the present embodiment.

It should be noted that the brightness value X is fixed as a constant value regardless of an image to be processed in the present embodiment, but the brightness value X may be varied depending on the histogram. In an example shown in FIG. 9, it is assumed that the correction is not performed (gamma value=1) in the range of the brightness value is 0 to X. However, in a case where the ratio $S_{low}$ is assumed to be 6% to 19%, the gradation in an area of exceeding the brightness value X may be extended by slightly erasing the gradation in the low-brightness area, e.g., inclining a linear inclination obtained from the gradation curve drawn between the brightness value 0 and the brightness value X to an inclination of ½.

In the above example, as shown in FIG. 10, a straight line in the low-brightness area is simply linked with gamma curves in the intermediate brightness area and the high-brightness area. However, it is needless to say that more sequential representation of the gradation can be realized by smoothly linking the straight line with the curves.

(LUT Creation)

When the above gradation curve judgement process (step S2 in FIG. 4) ended, the LUT is created in a step S3 shown in FIG. 4. That is, the look-up table (LUT) used in correcting brightness is created on the basis of the gradation curve indicated by the gamma value obtained in the gradation curve judgement process.

The LUT in the present embodiment performs a correction, wherein a value obtained by multiplying the maximum brightness value by a value calculated from a method of exponentially multiplying a ratio of each input brightness signal for the maximum brightness value by a reciprocal number of the gamma value obtained as above mention is treated as an output brightness signal. All the brightness values obtained in correcting relation using the above gamma value are written in the LUT corresponding to all the values (brightness value 0 to 255) within a range of brightness.

That is, when an input brightness signal is assumed to be Y and an output brightness signal is assumed to be Y', the conversion expressed by an expression $Y'=255\times[(Y/255)^{1/\gamma}]$ is performed, and an LUT L[Y] is dynamically created. That is, the LUT L[Y] is created every process of the image to be processed. By dynamically creating the correction table, it is possible to reduce the necessary memory size.

It is needless to say that the above LUT may be statically provided on a memory beforehand for each gamma value, instead of the dynamic creation.

(Correction)

Next, in a step S4 of FIG. 4, the brightness signal Y is corrected. That is, the brightness value Y of the input image is converted by the created LUT L[Y] into Y'=L[Y], and the correction is performed (the process of a block B2 (gamma conversion unit) shown in FIG. 3).

Further, the brightness signal Y' of which brightness was corrected and color difference signals Cr and Cb are replaced to the signals R, G and B (the process of a block B3 shown in FIG. 3), then signals R', G' and B' are created.

It should be noted that the correction of the brightness signal Y is explained in the present embodiment, however, the similar correction may be directly performed to each of the signals R, G and B. In this case, the above LUT is used, and in this LUT, the correction can be performed by using the signals R, G and B instead of the signal Y and the signals R', G' and B' instead of the signal Y'.

Since the correction to be performed to the signals R, G and B does not require RGB-YCrBr conversion, it is possible to increase process speed.

[Second Embodiment]

The present embodiment relates to another example of the HLP judgement concerning a so-called backlight image. Since the printing system in the present embodiment is the same as that in the abovementioned first embodiment, the explanation thereof will be omitted. The different point is only the following process.

(Process for Backlight Image)

In taken images such as a digital photograph and the like, there is the backlight image of which background area is light and subject area is dark. FIG. 10 shows a typical histogram of the backlight image.

As shown in FIG. 10, a great peak appears in the high-brightness area of the histogram in correspondence with the light background. Due to this peak in the high-brightness area, HLP>Th is given in the image lightness judgement based on the HLP explained in the abovementioned first embodiment. Thus, even if the subject itself is dark, there is some fear that the entire image is erroneously judged to be a light image.

Thus, in the present embodiment, before the HLP judgement is performed, the process to previously cut an unnatural peak appeared in the high-brightness area is performed.

Figure 11:
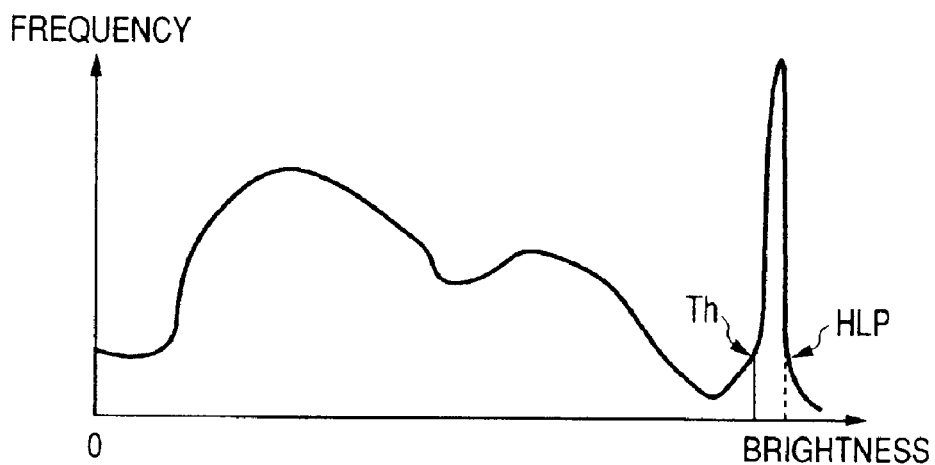
FIG. 11 is a view showing a histogram of a typical back light image.
Figure 12:
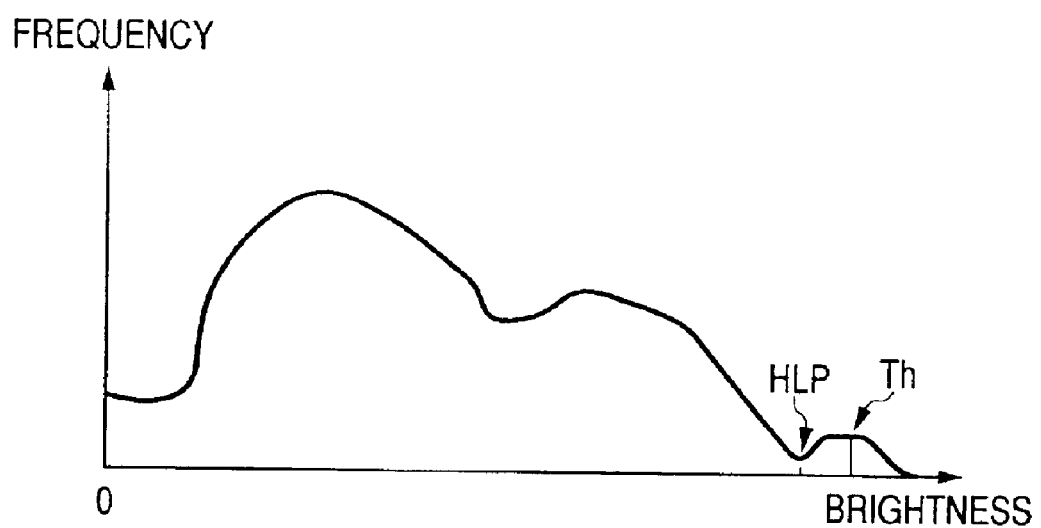
FIG. 12 is a view showing a histogram of eliminating influence of the back light in the histogram shown in FIG. 11.

For example, in the histogram of FIG. 10 representing the backlight image, the unnatural peak in the high-brightness area represents the backlight on the background. Thus, by performing the process to previously cut this unnatural peak, it is possible to perform gamma judgement which values the subject without being influenced by the high-brightness background area. FIG. 11 shows a histogram which is obtained by cutting the unnatural peak corresponding to the background area in the histogram of the backlight image of FIG. 10.

The cutting of the peak of the background area is performed as follows.

First, it is assumed that the peak exists over the five-pixel width (the brightness values 240 to 244) in the vicinity of the brightness value 240. In this situation, in the high-brightness area (e.g., the brightness values 230 to 255), to smooth the frequency of the peak according to the average value of the frequency of the brightness in the high-brightness area on the periphery of the range where the peak exists, several pixel values in the peak are extracted in the highest-frequency order. The number of pixel values to be extracted should have, even if the lowest, five or more being the number of pixels in the peak so as to cut the peak area entirely. Here, it is assumed that seven pixel values are extracted. Next, the average value of the frequency is obtained by the remaining brightness values (26−7=19), and the frequency of each of the five brightness values of the peak area extracted previously is replaced with the average value, whereby the peak is smoothed by the average value.

As described above, the peak of the high-brightness area existing in the background image can be cut and averaged, whereby the brightness of the HLP can be decreased below the threshold Th. Namely, this image can be judged to be the original dark image. As a result, although the set gamma value is 0.8 in the histogram before the peak correction shown in FIG. 10, the gamma value can be set to be 1.0 by decreasing the highlight point in correspondence with the true image as shown in FIG. 11, whereby the unnecessary correction can be omitted.

[Third Embodiment]

Generally, it is known that an output image becomes fine by appropriately increasing its density and thus the excellent and satisfactory image can be obtained. However, if the density of the output image is increased uniformly, in an image containing a lot of dark parts, gradation in such the dark part is crushed or failed, whereby image quality is rather decreased occasionally.

On the other hand, in a photograph taken nighttime or indoors dark, the entire image thereof is dark due to under exposure or the like, whereby the color in the image might be too different from the true color. In this case, by decreasing the density of the output image, it is possible to lighten the dark image overall and thus finish it up in the detail obviously.

Further, a dynamic range of brightness of an image might narrow very much due to accuracy of a CCD of a digital camera or a photographing condition. In such a case, by expanding the gradation of the image, it is possible to convert the obtained image into an image which is contrastedly and sightly.

The present embodiment aims to increase the quality of the output image by appropriately setting a correction condition according to the characteristic of the image.

Hereinafter, like the first embodiment, automatic gradation correction of the present embodiment which is performed as the image correction process of FIG. 2 will be explained.

Figure 18:
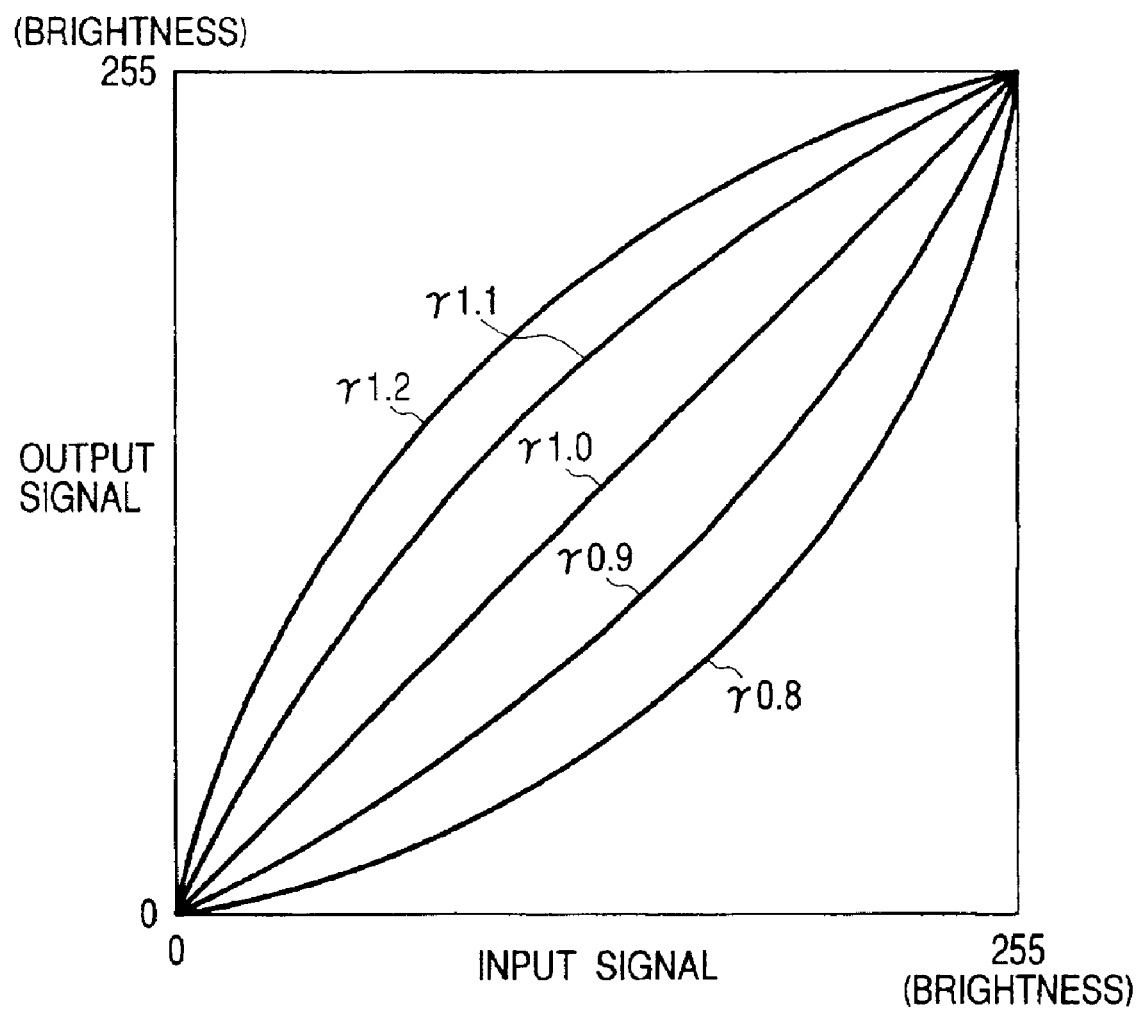
FIG. 18 is a view showing the conversion characteristic curve (exponential function) of the brightness correction table corresponding to the gamma value.

In the automatic gradation correction of the present embodiment, lightness of the image to be printed is judged by using a histogram in which frequency of brightness values in the image data are summed, and an appropriate correction gradation curve is determined based on the judged result. In the automatic gradation correction of the present embodiment, an image with few high density parts, i.e., shadow parts, is corrected by using the gamma curve (e.g., the gamma curve of convex below shown in FIG. 18), and the density of the entire image is increased to bring it overall close to the density of the silver bromide photograph output by a device capable of performing high-density output. On the other hand, an image which is overall dark because there is a lot of shadow parts is corrected by using the gamma curve (e.g., the gamma curve of convex above shown in FIG. 18) to lighten the image, whereby the balance of the entire image can be improved. Further, an image with narrow width of histogram is corrected by using the gamma curve (e.g., the S curve shown in FIG. 11) for expanding its dynamic range, whereby an image which is contrastedly and sightly can be obtained.

Hereinafter, the automatic gradation correction in the present embodiment will be explained according to the process procedure shown in FIG. 4.

(Histogram Summation)

In the histogram summation process in the step S1, input image signals R, G and B are first converted into a brightness signal Y representing a lightness component of the image and color difference signals Cr and Cb representing tint components of the image (the block B1 of FIG. 3). Expressions of such the conversion are as follows.

$Y=0.299 \times R+0.587 \times G+0.114 \times B$ $Cr=R-Y$ $Cb=B-Y$

Next, in the converted signals Y, Cr and Cb, the brightness value (the value of the signal Y) of each pixel in the image data is checked for the signal Y corresponding to the brightness, the frequency of the pixels having such the brightness value are summed for each of the brightness values represented 0 to 255, and the histogram (frequency distribution) of the brightness is created.

Figure 13:
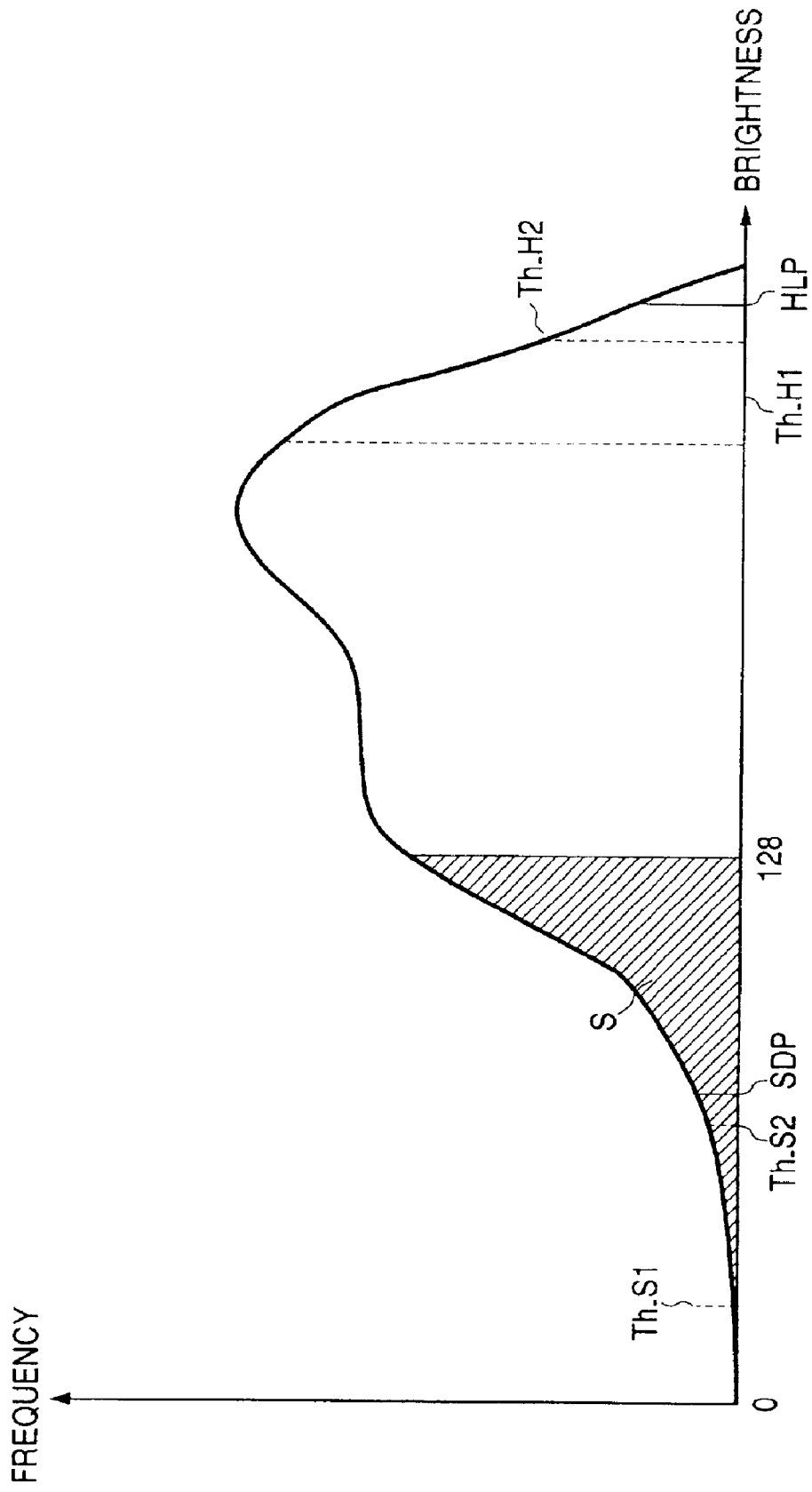
FIG. 13 is a view showing a histogram in a case where the image to be processed by the automatic gradation correction process is a light image.
Figure 15:
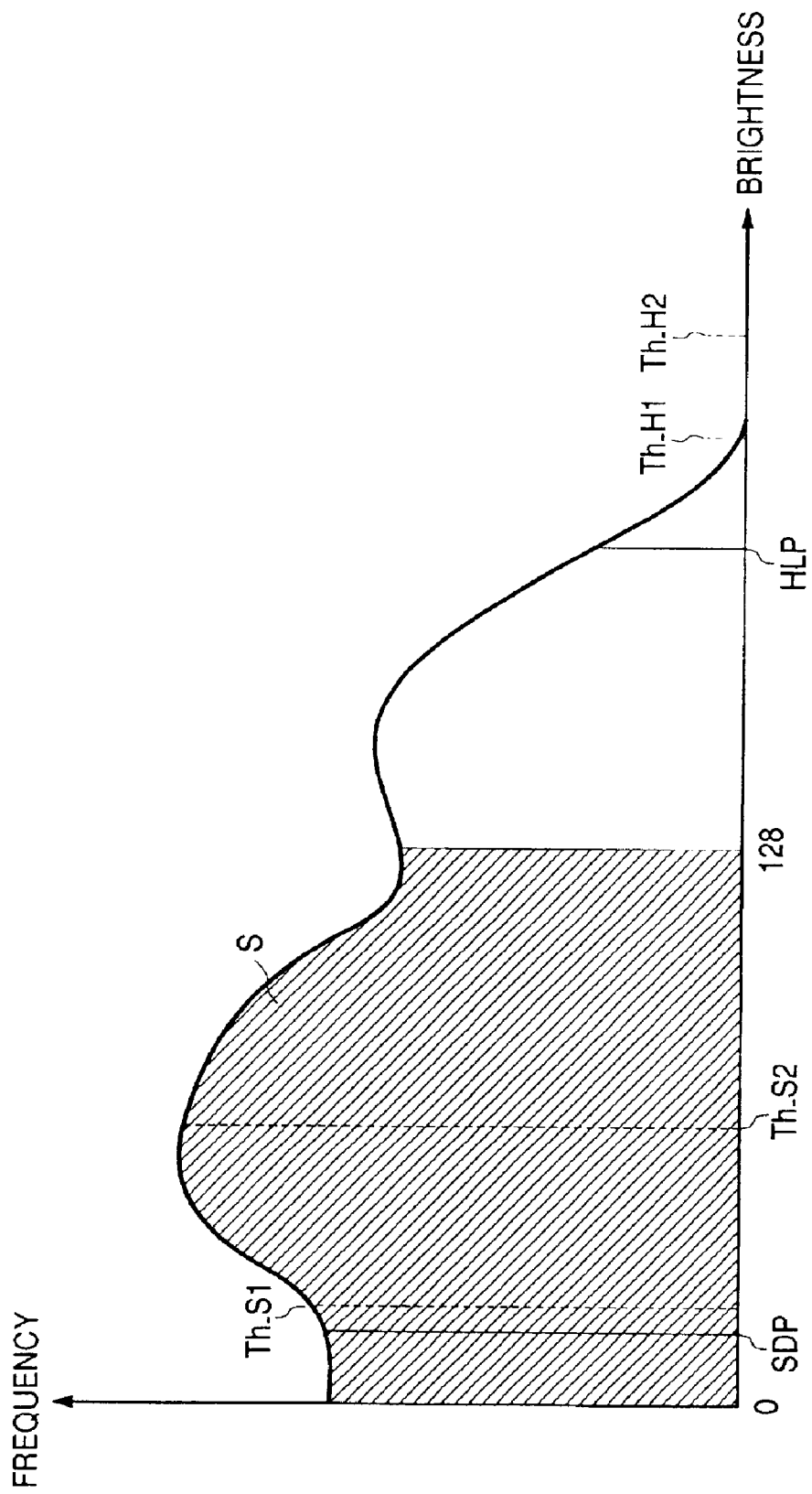
FIG. 15 is a view showing a histogram in a case where the image to be processed by the automatic gradation correction process is a dark image.

In the histogram thus created, for example, when the image data represents a light image overall, the distribution is biased to the high brightness side as shown in FIG. 13, on the other hand, when the image data represents a dark image overall, the distribution is biased to the low brightness side as shown in FIG. 15.

Since the above creation of the brightness histogram aims to check the frequency distribution of the brightness in the entire image, the frequency need not necessarily be calculated for all the pixels. For example, for the image data of 1600 (pixels)×1200 (pixels), the summation may be performed only to the pixels obtained by thinning out 15 pixels laterally and 11 pixels longitudinally, or the summation may be performed by using average values of the thinned-out pixels and their peripheral pixels.

(Gradation Curve Judgement)

In the step S2, a correction condition setting process (a gradation curve judgement process) is performed based on the obtained histogram. Namely, a gradation curve is selected from among plural gradation curves prepared beforehand for brightness correction, on the basis of the image analysis result.

In the gradation curve judgement of the present embodiment, lightness of the image is judged based on three parameters (a highlight point, a shadow point, and the number of pixels of one brightness area), and the gradation curve is selected based on the judged lightness.

Figure 16:
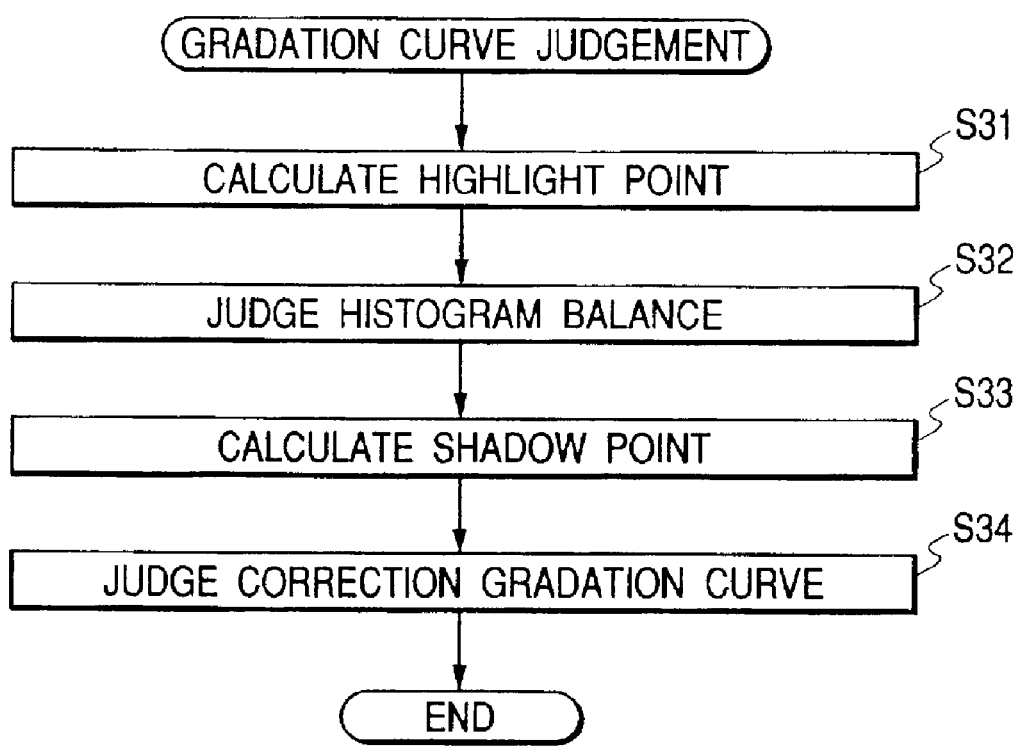
FIG. 16 is a flow chart showing the process procedure of the gradation curve judgement in the automatic gradation correction process shown in FIG. 4.

FIG. 16 is a flow chart showing the detail of the gradation curve judgement process, and the gradation curve judgement process in the present embodiment will be explained with reference to this flow chart.

(Highlight Point Judgement)

In the highlight point judgement process in a step S31, a highlight point in the image being the process object is calculated from the above histogram.

In the present embodiment, from the maximum brightness value (the brightness value 255) within the brightness range in the histogram of the brightness signal Y, the frequency of the respective brightness values are accumulated toward the low brightness in due order. Then, the brightness value in which the obtained cumulative frequency is consistent with 1.0% of all the pixels in the image data being the process object or first exceed 1.0% of all the pixels is obtained, and this value is set to be a highlight point (hereinafter called "HLP").

Next, the HLP is compared with plural predetermined thresholds Th_H1, Th_H2, . . . (Th_H1<Th_H2< . . . ) to analyze the distribution in the high-brightness area of the histogram.

For example, in the present embodiment, a case as shown in FIG. 17 where two thresholds to which values 200 and 230 are set from below in due order will be explained. When HLP<Th_H1, the image is judged to be an image of which high-brightness area is small and which is thus dark. When Th_H1≦HLP<Th_H2, the image is judged to be an image which contains the distribution of the high-brightness area but is dark overall. When Th_H2≦HLP, the image is judged to be an image which contains a lot of distribution of the high-brightness area and is thus light overall.

For example, in a histogram of a comparatively light image shown in FIG. 13, the HLP exceeds the threshold Th_H2 (HLP>Th_H2), whereby the image is judged to be the image which contains a lot of distribution in the high-brightness area. In this case, since the distribution of the histogram is overall biased to the high-brightness side, the HLP is positioned on the high-brightness side as a result. The image of such the distribution is generally a light image.

Figure 14:
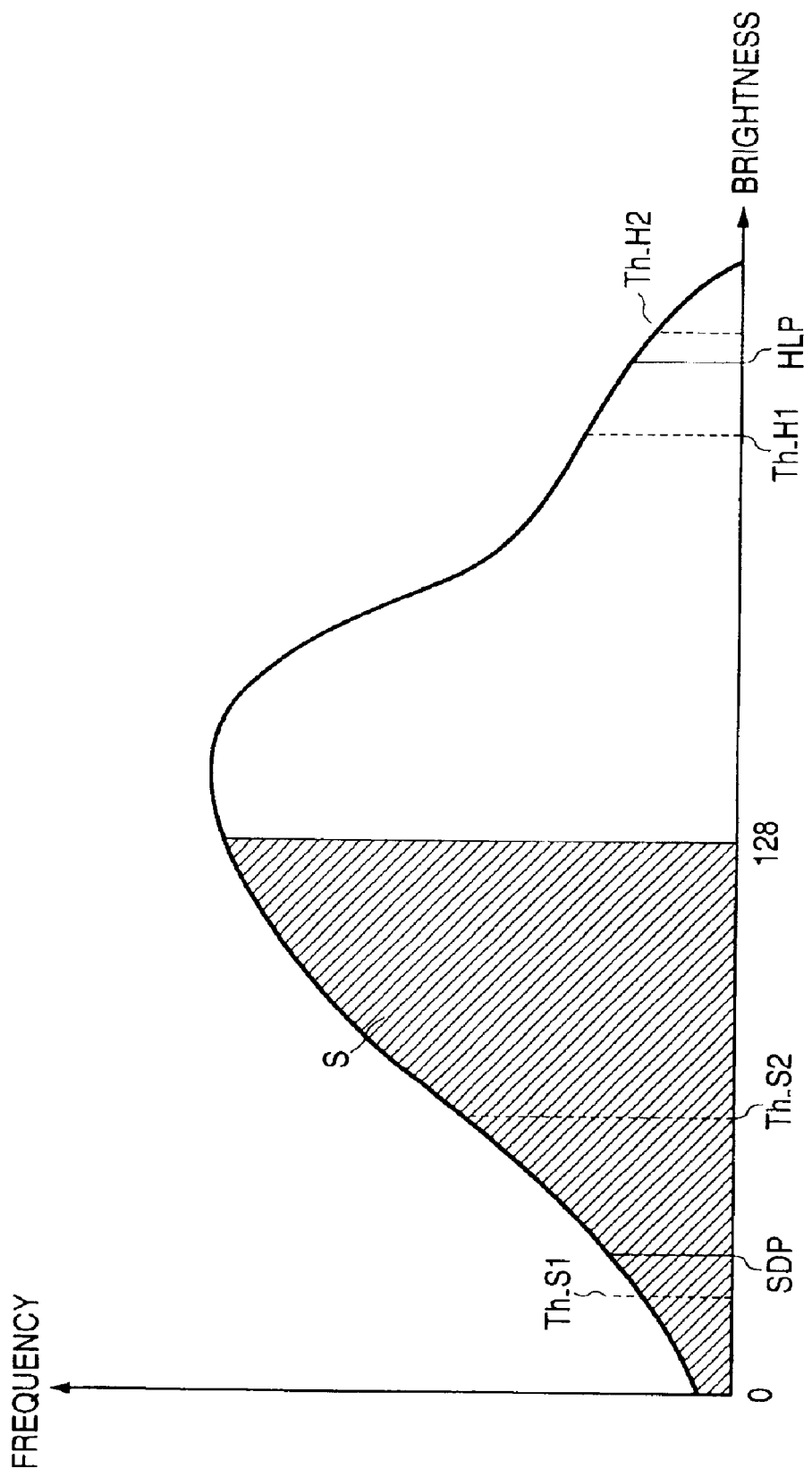
FIG. 14 is a view showing a histogram in a case where the image to be processed by the automatic gradation correction process is an intermediate brightness image.

In a histogram shown in FIG. 14, the HLP is lower than the threshold Th_H2 and higher than the threshold Th_H1 (Th_H1<HLP≦Th_H2), whereby the image can be considered to the image which contains the distribution of the high-brightness area to some extent but is not light. In the histogram of FIG. 6, since the brightness roughly shows intermediate distribution and is positioned comparatively on the low-brightness side, such the judgement as above is possible.

In a histogram shown in FIG. 15, the HLP is lower than the threshold Th_H1, whereby the image can be considered to the image which does not contain the distribution of the high-brightness area. In this case, it can be understood that the histogram is biased to the low-brightness side and thus the image is dark overall. The HLP low represents that, i.e., the gradation level is narrow. Thus, for such the image, it is necessary to lighten the image by gamma correction or by expanding the brightness value to the high-brightness side.

It should be noted that the calculation of the HLP need not necessarily depend on the above method, and may properly depend on the conventional method.

Further, it should be noted that, when the automatic gradation correction process in the present embodiment is combined with other image correction process such as the above color fog correction, the contrast correction or the saturation correction, the HLP previously used in the above image process can be used. In this case, instead of the HLP, lightness (darkness) of the image can be judged by using a shadow point similarly used in the above color fog correction or the like, and the following process possible based on this will be clear from the following explanations.

(Balance Judgement of Histogram)

In a step S32, the balance of the histogram is judged by using the histogram obtained in the step S1 of FIG. 4.

In a balance judgement process of the histogram, an $S_{low}$ being a ratio of the cumulative frequency in a predetermined area to the number of all the pixels of an image to be processed is obtained in the step S32. Namely, the ratio of the number of the cumulative pixels of the brightness values 0 to 128 (half of the histogram) to the number of all the pixels is obtained for the image of, e.g., 256 gradations, and the entire balance of the histogram of this image is analyzed.

First, a cumulative frequency S in one-brightness area (0 to 128) is calculated. This cumulative frequency S is obtained as the cumulative frequency accumulated up to a predetermined brightness value sliding from the lowest brightness value (brightness value 0) to the high-brightness side within a brightness range of the histogram. In the present embodiment, although the cumulative frequency up to the brightness value (brightness value 128) being the half of the maximum brightness value (brightness value 255) is obtained as the cumulative frequency S in the low-brightness area, of course other value may be used.

Next, the ratio $S_{low}$ being a ratio of the obtained cumulative frequency S to the number of all the pixels is calculated by using the following expression.

$S_{low}$=(cumulative frequency $S$ in one-brightness area)/(the number of all the pixels) (%)

In the above histogram summation, when the pixels are thinned out to create the thinned-out histogram, the denominator of the expression of the ratio $S_{low}$ is to the number of pixels to which the histogram is created.

Next, the threshold is again judged by using the ratio $S_{low}$ obtained as above. The purpose of this is to check the overall brightness balance of the image by calculating the ratio which occupies the whole in the lower half of the histogram. In the above highlight point judgement, the image is classified into plural kinds in accordance with the distribution state of the high-brightness area of the histogram, and as shown in FIG. 17 the threshold corresponding to each case is provided to judge the degree of the balance of the histogram.

For example, in case of the comparatively light image shown in FIG. 13, the ratio of the area indicated by oblique lines to the number of all the pixels is to be $S_{low}$. In this example, since the ratio $S_{low}$ reaches 20%, the image is judged to be the light image by the HLP judgement and it is judged that the ratio $S_{low}$ is in the range 16 to 50.

On the other hand, in case of the comparatively dark image shown in FIG. 15, since the ratio $S_{low}$ indicated by oblique lines to the number of all the pixels reaches 60%, the image is judged to be the dark image by the HLP judgement and it is judged that the ratio $S_{low}$ is in a range 50 to 80.

In the method of judging the balance of the histogram by using only the intermediate value or the average value of the histogram without using the ratio of the cumulative frequency in one-brightness area, the lightness of the image on which the actual distribution of the histogram is not appropriately reflected is judged. For example, there is an image that the intermediate value or the average value indicates a comparatively high-brightness value, but the peak of the frequency distribution actually exists in the brightness value around the intermediate value or the average value, and the frequency distribution in the low-brightness area is a little.

There is a case where such the image is erroneously judged to be the light image, the brightness correction to increase the density is thus selected, and the dark part which occupies a comparatively large part in the image part crushes as a result.

On the other hand, in the present embodiment, the cumulative frequency in the area of the brightness values 0 to 128 being the lower half of the histogram is obtained, and the ratio $S_{low}$ of the cumulative frequency to the number of all the pixels is used, whereby the lightness of the image on which the actual distribution of the histogram is well reflected can be judged, and appropriate gradation correction is possible even to such the dark image as above.

In the present embodiment, as to the range of the ratio $S_{low}$, although the range of the brightness values 0 to 128 is uniformly divided, if more detailed information of the low-brightness area is to be obtained, the low-brightness area may be divided into some parts and the situation division may be performed to each of the divided parts. Also, the ratio $S_{low}$ may be weighted twice in the range of the brightness values 0 to 64 and once in the range of the brightness values 65 to 128 and then weighted values may be added.

(Shadow Point Judgement)

In a shadow point judgement process in a step S33, the shadow point in the image being the process object is first calculated from the above histogram.

In the present embodiment, the frequency of each brightness value is accumulated successively sliding from the lowest brightness value (brightness value 0) within a brightness range of the histogram to the high-brightness side. As to the obtained cumulative frequency, e.g., the brightness value coincided with 1.0% of the number of all the pixels of the image data to be processed or the brightness value initially exceeding 1.0% of the number of all the pixels is obtained, and the point of this value is assumed to be a shadow point (hereinafter called "SDP").

Next, the SDP is compared with plural predetermined thresholds Th_S1, Th_S2, . . . (Th_S1<Th_S2< . . . ) to analyze the distribution in the low-brightness area of the histogram.

Since the shadow point judgement in the present embodiment is performed after the highlight point judgement and the histogram balance judgement were performed, the threshold for the shadow point is different according to the results of the highlight point judgement and the histogram balance judgement as shown in FIG. 17.

When SDP≧Th_S2, the image is judged to be an image of which low-brightness area is small and which is thus light. When Th_S1≦SDP<Th_S2, the image is judged to be an image which contains the distribution of the low-brightness area but is light overall. When SDP<Th_S1, the image is judged to be an image which contains a lot of distribution of the low-brightness area and is thus dark overall.

For example, in the histogram of the comparatively light image shown in FIG. 13, the SDP exceeds the threshold Th_S2 (SDP>Th_S2), whereby the image is judged to be the image which contains no distribution in the low-brightness area. In this case, since the distribution of the histogram is overall biased to the high-brightness side as described above, the SDP is positioned on the high-brightness side as a result. The SDP high represents that, i.e., the gradation level is narrow. Thus, for such the image, it is necessary to darken the image by the gamma correction or by expanding the brightness value to the low-brightness side.

On the other hand, in the histogram of FIG. 14, the SDP is lower than the threshold Th_S2 and higher than the threshold Th_S1 (Th_S1<SDP≦Th_S2), whereby the image can be considered to the image which contains the distribution of the low-brightness area to some extent but is not dark. In this case, since the brightness roughly shows intermediate distribution and the SDP is positioned comparatively on the low-brightness side, such the judgement as above is possible.

In the histogram of FIG. 15, the SDP is lower than the threshold Th_S1, whereby the image can be considered to the image which contains a lot of distribution of the low-brightness area. In this case, it can be understood that the histogram is biased to the low-brightness side and thus the image is dark overall.

(Determination of Correction Gradation Curve)

As shown in FIG. 17, the image to be processed is classified into plural kinds in accordance with the above three parameters, i.e., the detail of the distribution of the high-brightness area in the histogram (the highlight point), the ratio $S_{low}$ (the balance degree of the histogram), and the detail of the distribution of the low-brightness area (the shadow point). Then, in a next step S34, the correction gradation curve is determined by using the correction table shown in FIG. 17.

In the present embodiment, as apparent from the correction table shown in FIG. 17, for example, if the highlight point is comparatively low, the gradation curve by which a process to cut the high-brightness area and expand the histogram to the high-brightness side is added is selected by judging overall the image kind according to the three paramters. Further, the gradation curve to perform gamma correction is selected to the image of which histogram balance is intended to be adjusted. If the balance degree (the ratio) $S_{low}$ of the histogram is biased to the low-brightness area, the gradation curve by which a process to lighten the image with gamma conversion or the like is selected. Further, if the shadow point is comparatively high, the gradation curve by which a process to cut the low-brightness area and expand the histogram to the low-brightness side is added is selected. In any case, the gradation curve concerning the plural classified images as above is determined by using the judgement table shown in FIG. 17.

For example, in case of the image that the HLP is 245 (high), the ratio $S_{low}$ is 20% and the SDP is 60 (comparatively high), the gradation curve by which the low-brightness area (20 or less) is cut is selected.

In case of the light image shown in FIG. 13, since the HLP is larger than the threshold Th_H2, the ratio $S_{low}$ is 20% and the SDP is larger than the threshold Th_S2, this image is judged to be the light image by using the table shown in FIG. 17, and the gamma value is set to be 1.1. Based on this set gamma value, the correction to darken the image up to the comparatively high-brightness area (i.e., increase a printing density) is performed, whereby the printed image of which density is optimum overall can be obtained. Further, since the ratio is small in the pixel of the low-brightness area, the part where the image crushes can be a little.

Next, in case of the image that the histogram balance is intermediate as shown in FIG. 14, since the HLP is larger than the threshold Th_H1 and smaller than the threshold Th_H2, the ratio $S_{low}$ is 40% and the SDP is larger than the threshold Th_S1 and smaller than the threshold Th_S2, the contrast of this image can be emphasized by selecting the S-shaped correction gradation curve by using the table shown in FIG. 17. Thus, there is modulation in the entire printed image, whereby the sightly image can be obtained.

On the other hand, in case of the dark image shown in FIG. 15, since the HLP is smaller than the threshold Th__H1, the ratio $S_{low}$ is 60% and the SDP is smaller than the threshold Th__S1, the straight line by which the value 200 or more is cut in the high-brightness area is selected by using the table shown in FIG. 17. Thus, the printed image is light overall, especially the histogram of the image is expanded to the high-brightness side, whereby the well-contrasted and density-balanced printed image can be obtained.

In the above explanation, although the three-step lightness judgement for the high-brightness area of the image is performed in the highlight point judgement (S31), four-step or more lightness judgement to obtain the further optimum gradation curve may be performed for more detailed judgement. Further, even in the histogram balance judgement (S32) and the shadow point judgement (S33), the number of options may be increased for more detailed judgement.

(LUT Creation)

When the above gradation curve judgement process (step S2 in FIG. 4) ended, the LUT is created in the step S3 shown in FIG. 4. That is, the look-up table (LUT) used in correcting brightness is created on the basis of the gradation curve obtained in the gradation curve judgement process.

Figure 19:
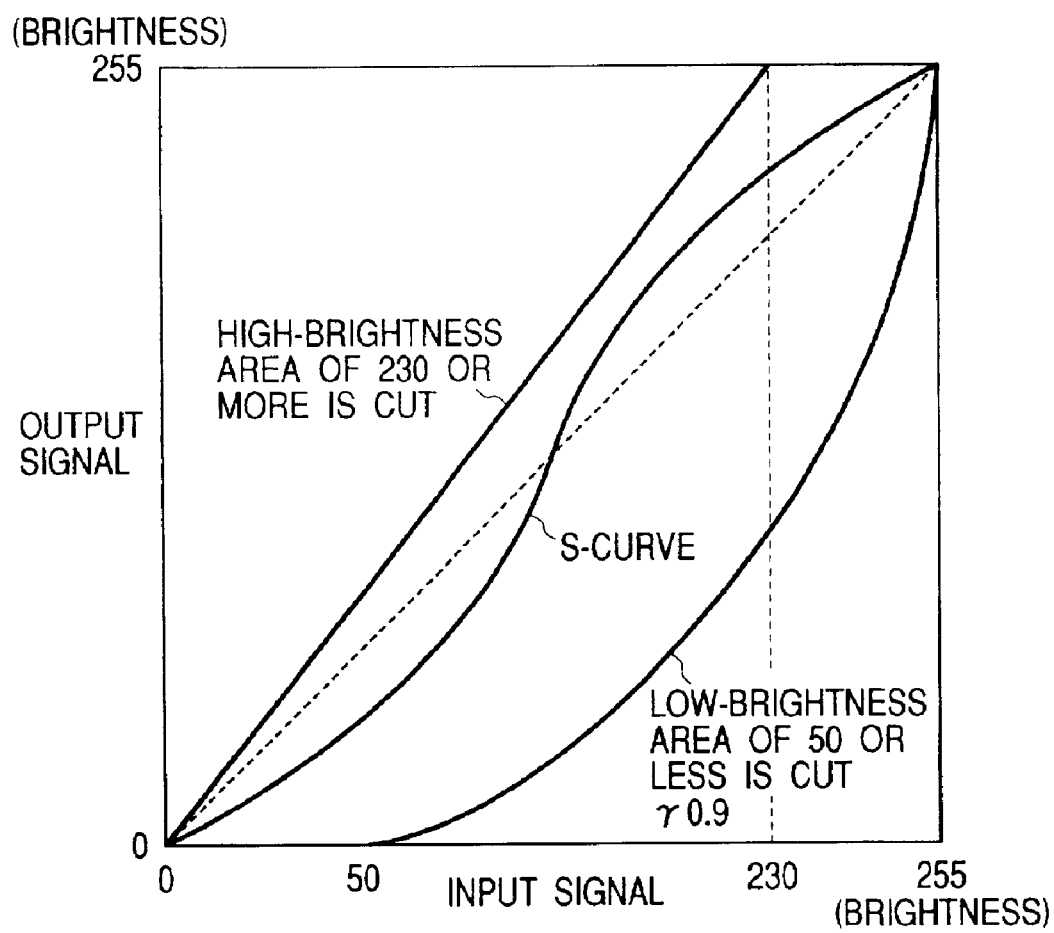
FIG. 19 is a view showing the conversion characteristic curve (fifth-order curve) of the brightness correction table used for performing other than merely gamma conversion.
Figure 20:
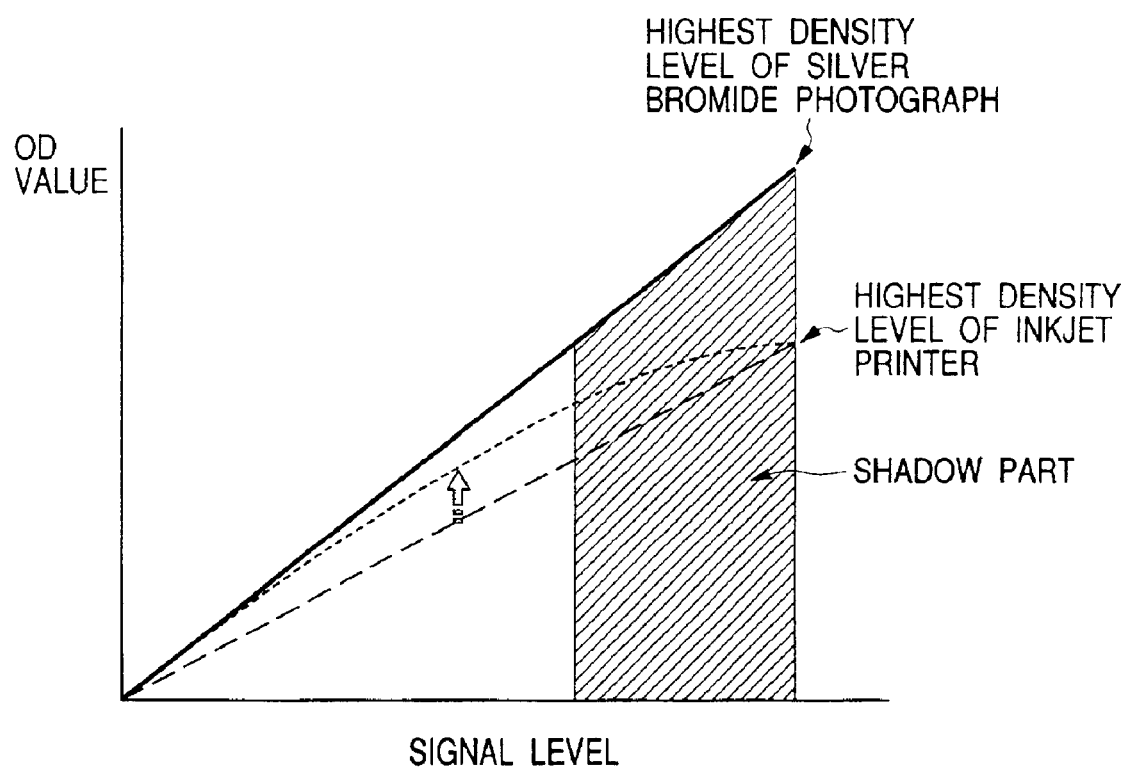
FIG. 20 is a view for explaining correction content of an embodiment according to the present invention.

The LUT in the present embodiment stores the above-obtained gradation curve as an exponential function and a fifth-order function. Namely, the exponential function (FIG. 18) is used when only the gamma correction is simply performed, while a fifth-order curve (FIG. 19) is used when the correction is performed by using the straight line for cutting the high-brightness or low-brightness area and the complicated curve.

That is, when an input brightness signal is assumed to be Y and an output brightness signal is assumed to be Y', the conversion expressed by an expression $Y'=255\times[(Y/255)^{1/\gamma}]$ is performed, and the gamma value is obtained from the judged result.

On the other hand, in case of the fifth-order curve, the conversion expressed by an expression $Y'=A+B\times Y+C\times Y^2+D\times Y^3+E\times Y^4+F\times Y^5$ is performed, and the coefficients A, B, C, D, E and F are given. Thus, the fifth-order curve completes and is dynamically created. That is, this is created every process of the image to be processed. By dynamically creating the correction table, it is possible to reduce the necessary memory quantity.

It is needless to say that the above LUT may be statically provided on a memory beforehand for each gradation curve, instead of the dynamic creation.

(Correction)

Next, in the step S4 shown in FIG. 4, the brightness signal Y is corrected. That is, the brightness value Y of the input image is converted by the created LUT L[Y] into Y'=L[Y], and the brightness correction is performed (the process of the block B2 in FIG. 3).

Further, the brightness signal Y' of which brightness was corrected and color difference signals Cr and Cb of the input image are returned to the signals R, G and B (the process of the block B3 in FIG. 3), then corrected image signals R', G' and B' are created.

According to the present embodiment, in the histogram, it is possible to obtain the component value representing that the cumulative frequency from the maximum or minimum value of the range of the component value concerning the lightness of the image data represents a predetermined value, whereby entire lightness of the image can be known. Further, it is possible to obtain the ratio of the cumulative frequency from the maximum or minimum value up to the predetermined component value to the number of all the pixels of the histogram, whereby the distribution of the lightness of the image can be known. Further, it is possible to judge the distribution of the lightness based on the component value and the ratio and then determine the correction gradation curve based on the judged result, the correspondence between the distribution of the lightness and the correction gradation curve can be varied for each of entire lightness of the image.

Namely, one optimum correction gradation curve for the image can be finally selected from among the plural correction gradation curves by using the three parameters, i.e., the highlight point, the balance degree of the histogram, and the shadow point.

Thus, for example, in the overall dark image, the distribution representing the dark range can be deceased by the distribution of the lightness corresponding to the correction to further lighten (i.e., to decrease the density of the printed image), whereby the balance of the lightness in the printed image can be made more favorable. On the other hand, in the overall light image, the density of the printed image can be increased by more darkening, whereby the density output characteristic that a printing device can essentially achieve only comparatively low density can be compensated, and high-density printing can be overall performed. Further, in an image with originally narrow dynamic range, it is possible to print a well-contrasted, density-balanced and sightly image.

In the present embodiment, although the judgement is performed in the order indicated in FIG. 15, such the order may be changed.

Further, the calculation of the HLP and the SDP is not limited to the above method, and a conventionally known method may be used appropriately.

In any case, as described above, the highlight point is used to check the distribution in the high-brightness area, and the shadow point is used to check the distribution of the lightness in the low-brightness area. However, for example, if the detail of the distribution of the lightness in the high-brightness area can be known by using other parameter instead of the highlight point, such the parameter may be used. Namely, it is possible to obtain the ratio of the cumulative frequency from the maximum value of the histogram up to one brightness value (e.g., the brightness value 220) to the number of all the pixels, and perform the judgement of the distribution of the lightness in the high-brightness area from the obtained result. In this case, like the highlight point, plural thresholds are provided for such the parameter, and the situation-division judgement is performed. Of course, even in the low-brightness area, it is possible to obtain instead of the shadow point the ratio of the cumulative frequency from the minimum value of the histogram up to one brightness value (e.g., the brightness value 30) to the number of all the pixels, and perform the similar judgement.

It should be noted that the correction of the brightness signal Y is explained in the present embodiment, however, the similar correction may be directly performed to each of the signals R, G and B. In this case, the above LUT is used, and in this LUT, the correction can be performed by using the signals R, G and B instead of the signal Y and the signals R', G' and B' instead of the signal Y'. Since the correction to be performed to the signals R, G and B does not require RGB-YCrBr conversion, it is possible to increase process speed.

[Other Embodiments]

As described above, the present invention may be applied to a system composed of plural devices (e.g., a host computer, an interface device, a reader, a printer, and the like), or to an apparatus consisting of one device (e.g., a copying machine, a fax machine, or the like).

The present invention includes a case where the program codes of software as shown in FIGS. 4, 7 and 16 for realizing the functions of the abovementioned embodiments to a computer provided in an apparatus or a system connected to various devices to operate these devices for realizing the functions of the abovementioned embodiments, and the computer (CPU or MPU) in the system or the apparatus operates the various devices according to the stored program.

In this case, the program code itself of the software realizes the functions of the abovementioned embodiments, whereby the program code itself and a means, e.g., a storage medium storing the program code, for supplying the program code to the computer constitute the present invention.

As the storage medium storing program code, e.g., a floppy disk, a hard disk, an optical disk, a magnetooptical disk, a CD-ROM, a magnetic tape, a nonvolatile memory card, a ROM, or the like may be used.

It is needless to say that, when the functions of the abovementioned embodiments are realized not only in the case where the supplied program code is executed by the computer, but also in a case where this program code cooperates with an OS (operating system) running on the computer or other application software, such the program code is included in the embodiment of the present invention.

Further, it is needless to say that the present invention includes a case where the supplied program code is once stored in a memory provided in a function expansion board inserted in the computer or a function expansion unit connected to the computer, and then a CPU or the like provided in the function expansion board or the function expansion unit performs all or a part of the actual processes based on instructions of the program code, whereby the functions of the abovementioned embodiments are achieved by such the processes.

Although the present invention has been explained with the preferred embodiments, the present invention is not limited to them. Namely, it is obvious that various modifications and changes are possible in the present invention without departing from the spirit and scope of the appended claims.

What is claimed is:

1. An image processing method which sets correction conditions for correcting components regarding brightness of image data on the basis of a histogram corresponding to the components regarding image brightness represented by the image data, and corrects the image data according to the set correction conditions, said method comprising the steps of:
    calculating a ratio of the components included within a predetermined range in the histogram; and
    setting the correction conditions for correcting components regarding the brightness of the image data on the basis of the calculated ratio.

2. A method according to claim 1, wherein the component value is a brightness value indicated by the image data.

3. A method according to claim 1,
    wherein increasing a degree of density is emphasized when a ratio of a highlight area is a large ratio as compared with a case that the ratio of the highlight area is a small ratio,
    wherein decreasing a degree of density is emphasized when a ratio of a shadow area is a large ratio as compared with a case that the ratio of the shadow area is a small ratio, and
    wherein expanding a degree of dynamic range is emphasized when the width of the histogram is narrow as compared with a case that the width of the histogram is wide.

4. A method according to claim 1, wherein said setting step of setting the correction conditions changes a correction for the image data, of which the components are within a predetermined range, among the set correction conditions when the calculated ratio exceeds a predetermined value, and sets the correction condition such that a correction of maintaining a calculated component value is to be performed.

5. A method according to claim 1, further comprising the steps of:
    calculating a component value in the histogram, wherein a cumulative frequency accumulated from the maximum component value or the minimum component value indicates a predetermined value within a range of the component value; and
    calculating the cumulative frequency from the minimum component value or the maximum component value to a predetermined component value,
    wherein said setting step of setting the correction conditions discriminates a degree of lightness on the basis of the calculated component value and the cumulative frequency, and sets the correction conditions on the basis of the discriminated degree of lightness and the calculated ratio.

6. A method according to claim 5, wherein said setting step of setting the correction conditions changes a correction for the image data from the minimum component value to a predetermined component value from among the correction conditions set based on the degree of lightness when the calculated ratio exceeds a predetermined value, and sets the correction condition such that a correction of maintaining the component value is to be performed.

7. A method according to claim 5, wherein said setting step of setting the correction conditions discriminates the degree of lightness on the basis of a ratio of the cumulative frequency for the number of all the pixels in the histogram.

8. A method according to claim 5, wherein said setting step of setting the correction conditions discriminates the brightness of the image with plural stages on the basis of the component value, and variably sets the correction conditions of the discriminated brightness classified into the plural stages.

9. A method according to claim 8, wherein said setting step of setting the correction conditions discriminates a brightness distribution of the image with plural stages of the discriminated brightness classified into the plural stages on the basis of the calculated ratio, and variably sets the correction conditions of the discriminated brightness distribution classified into the plural stages.

10. An image processing method which sets a correction condition for an input image in accordance with a ratio of a shadow area in the input image, said method comprising the steps of:
    setting a first correction condition for the input image in accordance with a ratio of a first shadow area in the input image; and
    adjusting a correction condition for a shadow area of the first correction condition in accordance with a ratio of a second shadow area, included in the first shadow area, in the input image.

11. An image processing method which discriminates a degree of lightness of an image on the basis of a histogram related to the number of pixels of a component value regarding image brightness indicated by image data, sets a degree of correction component regarding brightness of the image data on the basis of the discriminated result, and corrects the components according to the set degree of correction component, said method comprising the steps of:

calculating a component value in the histogram wherein a cumulative frequency accumulated from the maximum value or the minimum value indicates a predetermined value within a range of the component value;

calculating a cumulative frequency accumulated from the maximum value or the minimum value to a predetermined component value in the histogram;

discriminating the degree of lightness on the basis of the calculated component value and the cumulative frequency; and setting the degree of correction component on the basis of the discriminated result.

12. A method according to claim 11, wherein said setting step of setting the degree of correction component discriminates the degree of lightness on the basis of a ratio of the cumulative frequency to the number of pixels in the histogram.

13. A method according to claim 12, wherein said setting step of setting the degree of correction component discriminates brightness of an image with plural stages on the basis of the component value and variably sets the degree of correction component of the discriminated brightness classified into the plural stages.

14. A method according to claim 13, wherein said setting step of setting the degree of correction component discriminates a brightness distribution of the image with plural stages, the discriminated brightness being classified into the plural stages on the basis of the calculated ratio and variably sets the degree of correction component of the discriminated brightness distribution classified into the plural stages.

15. A method according to claim 11, wherein the component value is a brightness value indicated by the image data.

16. A method according to claim 11, wherein, when a peak of the cumulative frequency which is larger, by a predetermined level, than the surrounding cumulative frequency exists in a predetermined range of a relatively large component value within the range of the component value, said component value calculating step includes calculating the component value, wherein the cumulative frequency, except for the peak, indicates the predetermined value.

17. An image processing apparatus which sets correction conditions for correcting components regarding brightness of image data on the basis of a histogram corresponding to the components regarding image brightness represented by the image data, and corrects the image data according to the set correction conditions, comprising:

calculation means for calculating a ratio of the components included within a predetermined range in the histogram; and setting means for setting the correction conditions for correcting components regarding the brightness of the image data on the basis of the calculated ratio.

18. An image processing apparatus which sets a correction condition for an input image in accordance with a ratio of a shadow area in the input image, comprising:

setting means for setting a first correction condition for the input image in accordance with a ratio of a first shadow area in the input image; and adjustment means for adjusting a correction condition for a shadow area of the first correction condition in accordance with a ratio of a second shadow area, included in the first shadow area, in the input image.

19. An image processing apparatus which discriminates a degree of lightness of an image on the basis of a histogram related to the number of pixels of a component value regarding image brightness indicated by image data, sets a degree of correction component regarding brightness of the image data on the basis of the discriminated result, and corrects the components according to the set degree of correction component, comprising:

calculation means for calculating a component value in the histogram wherein a cumulative frequency accumulated from the maximum value or the minimum value indicates a predetermined value within a range of the component value;

calculation means for calculating a cumulative frequency accumulated from the maximum value or the minimum value to a predetermined component value in the histogram;

discrimination means for discriminating the degree of lightness on the basis of the calculated component value and the cumulative frequency; and setting means for setting the degree of correction component on the basis of the discriminated result.

20. A storage medium which stores a computer-readable program of a method which sets correction conditions for correcting components regarding brightness of image data on the basis of a histogram corresponding to the components regarding image brightness represented by the image data, and corrects the image data according to the set correction conditions, said program comprising:

code for calculating a ratio of the components included within a predetermined range in the histogram; and code for setting the correction conditions for correcting components regarding the brightness of the image data on the basis of the calculated ratio.

21. A storage medium which stores a computer-readable program of a method which sets a correction condition for an input image in accordance with a ratio of a shadow area in the input image, said program comprising:

code for setting a first correction condition for the input image in accordance with a ratio of a first shadow area in the input image; and code for adjusting a correction condition for a shadow area of the first correction condition in accordance with a ratio of a second shadow area, included in the first shadow area, in the input image.

22. A storage medium which stores a computer-readable program of a method which discriminates a degree of lightness of an image on the basis of a histogram related to the number of pixels of a component value regarding image brightness indicated by image data, sets a degree of correction component regarding brightness of the image data on the basis of the discriminated result, and corrects the components according to the set degree of correction component, said program comprising:

code for calculating a component value in the histogram wherein a cumulative frequency accumulated from the maximum value or the minimum value indicates a predetermined value within a range of the component value;

code for calculating a cumulative frequency accumulated from the maximum value or the minimum value to a predetermined component value in the histogram;

code for discriminating the degree of lightness on the basis of the calculated component value and the cumulative frequency; and code for setting the degree of correction component on the basis of the discriminated result.

23. An image processing method comprising the steps of:
discriminating a color distribution of an image from a histogram of the image:
acquiring a gradation correction condition for correcting the image on the basis of the discrimination discriminated in said discriminating step; and
correcting the image by using the acquired gradation correction condition,
wherein the discrimination of the color distribution of the image is executed by acquiring a highlight point and a shadow point of the image from the histogram, and a cumulative frequency of a predetermined range of the histogram.

24. An image processing apparatus comprising:
a discrimination unit adapted to discriminate a color distribution of an image from a histogram of the image:
an acquisition unit adapted to acquire a gradation correction condition for correcting the image on the basis of the discrimination performed by said discrimination unit; and
a correction unit adapted to correct the image by using the gradation correction condition acquired by said acquisition unit,
wherein said discrimination unit executes the discrimination of the color distribution of the image by acquiring a highlight point and a shadow point of the image from the histogram, and a cumulative frequency of a predetermined range of the histogram.

25. A storage medium which stores a computer-readable program of an image processing method, said program comprising:
code for discriminating a color distribution of an image from a histogram of the image;
code for acquiring a gradation correction condition for correcting the image on the basis of the discrimination performed by said discriminating code; and
code for correcting the image by using the acquired gradation correction condition,
wherein the discrimination of the color distribution of the image by said discriminating code is executed by acquiring a highlight point and a shadow point of the image from the histogram, and a cumulative frequency of a predetermined range of the histogram.

26. An image processing method for correcting brightness of image data, said method comprising the steps of:
discriminating, based on a histogram of the brightness of an image represented by the image data, a degree of lightness of the image;
acquiring, in the histogram, a ratio of cumulative frequency of a predetermined low-brightness area to the number of pixels being the targets in case of creating the histogram;
determining an extent of the correction on the basis of the discriminated degree of lightness of the image and the acquired ratio of cumulative frequency; and
correcting the brightness of the image data on the basis of the determined extent of the correction.

27. An image processing method according to claim 26, wherein:
the lightness of the image is discriminated with respect to plural levels on the basis of brightness values, and
the extent of the correction is determined differently with respect to each of the discriminated levels of the lightness.

28. An image processing method according to claim 27, wherein:
a distribution of the lightness of the image is discriminated with respect to each of the plural levels of the lightness, and
the extent of the correction is determined differently with respect to each of the discriminated levels of the distributions.

29. An image processing method for correcting brightness of image data, said method comprising the steps of:
discriminating, based on a histogram of the brightness of an image represented by the image data, a degree of lightness of the image;
acquiring, in the histogram, a ratio of a cumulative frequency of a first low-brightness area to the number of pixels being the targets in case of creating the histogram;
determining an extent of the correction on the basis of the discriminated degree of lightness of the image and the acquired ratio of cumulative frequency;
acquiring a ratio of a cumulative frequency of a second low-brightness area, different from the first low-brightness area, to the number of pixels being the targets in case of creating the histogram; and
correcting the brightness of the image data on the basis of the determined extent of the correction and the acquired ratio of the cumulative frequency of the second low-brightness area.

30. An image processing method according to claim 29, wherein, in said step of determining the extent of the correction, when the ratio of the cumulative frequency of the second low-brightness area is equal to or higher than a predetermined value, the extent of the correction is changed so that, with respect to the image data from having a minimum brightness value to having a predetermined brightness value, the relevant brightness values are maintained.

31. An image processing method according to claim 30, wherein the correction is executed when the extent of the correction is the extent of the correction of darkening the brightness.

32. An image processing apparatus for correcting brightness of image data, said apparatus comprising:
a discrimination unit adapted to discriminate, based on a histogram of the brightness of an image represented by the image data, a degree of lightness of the image;
an acquisition unit adapted to acquire, in the histogram, a ratio of a cumulative frequency of a predetermined low-brightness area to the number of pixels being the targets in case of creating the histogram;
a determination unit adapted to determine an extent of the correction on the basis of the discriminated degree of lightness of the image and acquired ratio of the cumulative frequency; and
a correction unit adapted to correct the brightness of the image data on the basis of the determined extent of the correction.

33. An image processing apparatus for correcting brightness of image data, said apparatus comprising:
a discrimination unit adapted to discriminate, based on a histogram of the brightness of an image represented by the image data, a degree of lightness of the image;
a first acquisition unit adapted to acquire, in the histogram, a ratio of a cumulative frequency of a first low-rightness area to the number of pixels being the targets in case of creating the histogram;

a determination unit adapted to determine an extent of the correction on the basis of the discriminated degree of lightness of the image and the acquired ratio of the cumulative frequency;

a second acquisition unit adapted to acquire a ratio of a cumulative frequency of a second low-brightness area, different from the first low-brightness area, to the number of pixels being the targets in case of creating the histogram; and a correction unit adapted to correct the brightness of the image data on the basis of the determined extent of the correction and the acquired ratio of the cumulative frequency of the second low-brightness area.

34. A storage medium which stores a program in a manner readable by an information processing apparatus, said program executing a method to achieve an image process for correcting brightness of image data, said program comprising:

code for discriminating, based on a histogram of the brightness of an image represented by the image data, a degree of lightness of the image;

code for acquiring, in the histogram, a ratio of the cumulative frequency of a predetermined low-brightness area to the number of pixels being the targets in case of creating the histogram;

code for determining an extent of the correction on the basis of the discriminated degree of lightness of the image and the acquired ratio of the cumulative frequency; and code for correcting the brightness of the image data on the basis of the determined extent of the correction.

35. A storage medium which stores a program in a manner readable by an information processing apparatus, said program executing a method to achieve an image process for correcting brightness of image data, said program comprising:

code for discriminating, based on a histogram of the brightness of an image represented by the image data, a degree of lightness of the image;

code for acquiring, in the histogram, a ratio of a cumulative frequency of a first low-brightness area to the number of pixels being the targets in case of creating the histogram;

code for determining an extent of the correction on the basis of the discriminated degree of lightness of the image and the acquired ratio of a cumulative frequency;

code for acquiring a ratio of a cumulative frequency of a second low-brightness area, different from the first low-brightness area, to the number of pixels being the targets in case of creating the histogram; and code for correcting the brightness of the image data on the basis of the determined extent of the correction and the acquired ratio of the cumulative frequency of the second low-brightness area.

36. An image processing method for correcting brightness of image data of an input process target, said method comprising the steps of:

calculating, when a peak having a frequency larger, by a predetermined level, than surrounding frequencies exists in a high-brightness area of a histogram represented by the image data, a value according to the frequency in the peak-surrounding high-brightness area, replacing the frequency of a peak-existing range of the histogram by the calculated value, and calculating a brightness value of a cumulative frequency from a maximum brightness value to a low-brightness side in the histogram of which the frequency that has been replaced indicates a predetermined value;

determining an extent of the correction based on the calculated brightness value; and correcting the brightness of the image data based on the determined extent of the correction.

37. An image processing method according to claim 36, wherein, in said calculating step, the value is acquired as an average value of the frequencies in the peak-surrounding high-brightness area.

38. An image processing method comprising:

setting, so as to make a density of an output image higher than a density of an input image, an extent of a correction for the input image in accordance with a ratio of a shadow area in the input image, wherein, in a case where the ratio of the shadow area is large, the extent of the correction is set so as to make the increase of the density small as compared with a case where the ratio of the shadow area is small.

39. An image processing method according to claim 38, wherein the extent of the correction is represented by a Γ parameter with respect to a component indicating lightness.

40. An image processing method according to claim 39, wherein a histogram is created based on the component indicating the lightness of the input image, and the ratio of the shadow area is acquired based on the created histogram.

41. An image processing apparatus for correcting brightness of image data, said apparatus comprising:

a calculation unit adapted to calculate, when a peak having a frequency larger, by a predetermined level, than surrounding frequencies exists in a high-brightness area of a histogram represented by the image data, a value according to the frequency in the peak surrounding high-brightness area, to replace the frequency of a peak-existing range of the histogram by the calculated value, and to calculate a brightness value of a cumulative frequency from a maximum brightness value to a low-brightness side in the histogram of which the frequency that has been replaced indicates a predetermined value;

a determination unit adapted to determine an extent of the correction based on the calculated brightness value; and a correction unit adapted to correct the brightness of the image data based on the determined extent of the correction.

42. An image processing apparatus comprising:

a setting unit adapted to set, so as to make a density of an output image higher than a density of an input image, an extent of a correction for the input image in accordance with a ratio of a shadow area in the input image, wherein, in case where the ratio of the shadow area is large, the extent of the correction is set so as to make the increase of the density small as compared with a case where the ratio of the shadow area is small.

43. A storage medium which stores a program in a manner readable by an information processing apparatus, said program executing a method to achieve an image process for correcting brightness of image data, said program comprising:

code for calculating, when a peak having a frequency larger, by a predetermined level, than surrounding frequencies exists in a high-brightness area of a histogram represented by the image data, a value according to the frequency in the peak-surrounding high-brightness area, replacing the frequency of a peak-existing range of the histogram by the calculated value, and calculating a brightness value of a cumulative frequency from a maximum brightness value to a low-brightness side in the histogram of which the frequency that has been replaced indicates a predetermined value;

code for determining an extent of the correction based on the calculated brightness value; and code for correcting the brightness of the image data based on the determined extent of the correction.

44. A storage medium which stores a program in a manner readable by an information processing apparatus, said program executing a method, to achieve an image process, said program comprising:

code for setting, so as to make a density of an output image higher than a density of an input image, an extent of a correction for the input image in accordance with a ratio of a shadow area in the input image, wherein, in a case where the ratio of the shadow area is large, the extent of the correction is set so as to make the increase of the density small as compared with a case where the ratio of the shadow area is small.

* * * * *

UNITED STATES PATENT AND TRADEMARK OFFICE
CERTIFICATE OF CORRECTION

| | |
|---|---|
| PATENT NO. | : 7,006,668 B2 |
| APPLICATION NO. | : 09/745481 |
| DATED | : February 28, 2006 |
| INVENTOR(S) | : Iguchi et al. |

It is certified that error appears in the above-identified patent and that said Letters Patent is hereby corrected as shown below:

On Title Page

Item [56] REFERENCES CITED

Foreign Patent Documents
"2002185793" should read --2002-185793--.
"JP 2000-13626 1/1990" should read --JP 2000-13626 1/2000--.

Item [57] ABSTRACT

Line 17, "the" should read --of the--.

COLUMN 1

Line 22, "cause," should read --causes,--.
Line 37, "color not be" should read --color not--.
Line 41, "perfect measures." should read --a perfect measure.--.
Line 60, "is found in" should read --that is found in the--.
Line 63, "level" should read --a level--.

COLUMN 2

Line 2, "been" should be deleted.

COLUMN 3

Line 41, "area." should read --area;--.
Line 47, "11." should read --11;--.

COLUMN 6

Line 46, "each" should read --to each--.

COLUMN 7

Line 26, "conventional" should read --conventionally--.

UNITED STATES PATENT AND TRADEMARK OFFICE
CERTIFICATE OF CORRECTION

PATENT NO. : 7,006,668 B2
APPLICATION NO. : 09/745481
DATED : February 28, 2006
INVENTOR(S) : Iguchi et al.

It is certified that error appears in the above-identified patent and that said Letters Patent is hereby corrected as shown below:

COLUMN 8

Line 8, "histogram" should read --in the histogram--.
Line 48, "on near" should read --on or near--.

COLUMN 9

Line 12, "The," should read --Then,--.
Line 19, "the" should be deleted.

COLUMN 11

Line 26, "within a range of $31 \leq Y \leq 255$." should be deleted.
Line 35, "the" should read deleted.
Line 45, "is" should be deleted.

COLUMN 12

Line 4, "above" should read --above---.
Line 5, "mention" should read --mentioned--.

COLUMN 15

Line 63, "process" should read --processes--.

COLUMN 16

Line 2, "possible" should read --is possible--.
Line 25, "value" should read --values--.
Line 46, "in" should read --in the--.

COLUMN 20

Line 15, "deceased" should read --decreased--.
Line 39, "other" should read --another--.

COLUMN 25

Line 5, "image:" should read --image;--.
Line 17, "image:" should read --image;--.

UNITED STATES PATENT AND TRADEMARK OFFICE
CERTIFICATE OF CORRECTION

PATENT NO. : 7,006,668 B2
APPLICATION NO. : 09/745481
DATED : February 28, 2006
INVENTOR(S) : Iguchi et al.

It is certified that error appears in the above-identified patent and that said Letters Patent is hereby corrected as shown below:

COLUMN 28

Line 22, "Γ" should read --γ--.

Signed and Sealed this

Twenty-fourth Day of October, 2006

JON W. DUDAS
*Director of the United States Patent and Trademark Office*